US012681585B2

(12) United States Patent
Amihood et al.

(10) Patent No.: US 12,681,585 B2
(45) Date of Patent: Jul. 14, 2026

(54) MULTI-MODAL GESTURE SENSING ON WEARABLE DEVICES

(71) Applicant: GOOGLE LLC, Mountain View, CA (US)

(72) Inventors: Patrick Muller Amihood, Palo Alto, CA (US); Octavio Ponce Madrigal, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/766,044

(22) Filed: Jul. 8, 2024

(65) Prior Publication Data

US 2025/0013310 A1      Jan. 9, 2025

Related U.S. Application Data

(60) Provisional application No. 63/512,371, filed on Jul. 7, 2023.

(51) Int. Cl.
*G06F 3/01* (2006.01)
*G06F 3/0346* (2013.01)

(52) U.S. Cl.
CPC ............ *G06F 3/017* (2013.01); *G06F 3/0346* (2013.01)

(58) Field of Classification Search
CPC ......... G06F 3/017; G06F 3/0346; G06F 3/014
See application file for complete search history.

(56) References Cited

U.S. PATENT DOCUMENTS

| | | | | |
|---|---|---|---|---|
| 10,916,245 B2* | 2/2021 | Kwatra | .................. | G06N 20/00 |
| 11,363,383 B2* | 6/2022 | Chen | .................... | H04W 88/08 |
| 2013/0328763 A1* | 12/2013 | Latta | ....................... | G06F 3/017 |
| | | | | 345/156 |
| 2014/0168058 A1* | 6/2014 | Heo | ........................ | G06F 3/017 |
| | | | | 345/156 |
| 2015/0261495 A1* | 9/2015 | Smus | ..................... | G06F 3/167 |
| | | | | 345/156 |
| 2017/0075425 A1* | 3/2017 | Kursula | .................. | G06F 3/014 |
| 2017/0343577 A1* | 11/2017 | Lefebvre | .............. | G06F 1/1694 |

(Continued)

OTHER PUBLICATIONS

Becker, et al., "Gestear: Combining Audio and Motion Sensing for Gesture Recognition on Smartwatches", Iswc '19; Association for Computing Machinery; https://doi.org/10.1145/3341163.3347735, Sep. 9-13, 2019, 10 pages.

*Primary Examiner* — Grant Sitta
(74) *Attorney, Agent, or Firm* — Brake Hughes Bellermann LLP

(57) ABSTRACT

Techniques include using, in addition to IMU signals, audio captured by one or more microphones on a wearable device to determine whether a gesture has been made, and if so, which gesture has been made. The IMUs provide a first electronic signal to processing circuitry on the wearable device in response to detected motion. The one or more microphones provide a second electronic signal to the processing circuitry in response to detected audio resulting from a gesture. The processing circuitry determines whether a predefined gesture has been made based at least on the first electronic signal and the second electronic signal. If the processing circuitry determines that the predefined gesture was made, the processing circuitry performs an operation on the wearable device corresponding to the predefined gesture.

22 Claims, 18 Drawing Sheets

100

(56)         References Cited

U.S. PATENT DOCUMENTS

| | | | |
|---|---|---|---|
| 2017/0366213 | A1 | 12/2017 | Camacho Perez et al. |
| 2019/0362557 | A1* | 11/2019 | Lacey ..................... G06F 3/012 |
| 2020/0150772 | A1 | 5/2020 | Quinn et al. |
| 2020/0310551 | A1* | 10/2020 | Chang ................... G06V 40/28 |
| 2020/0389740 | A1* | 12/2020 | Sabin .................. H04R 25/507 |
| 2023/0370792 | A1* | 11/2023 | Jensen ................ H04R 25/554 |
| 2023/0396941 | A1* | 12/2023 | Sturgeon ............. H04R 25/505 |
| 2024/0184378 | A1* | 6/2024 | Ghasemlou ............. G06F 3/017 |
| 2024/0284085 | A1* | 8/2024 | Vastare ........... H04M 1/724097 |
| 2024/0305937 | A1* | 9/2024 | Walsh ................. H04R 25/552 |

* cited by examiner

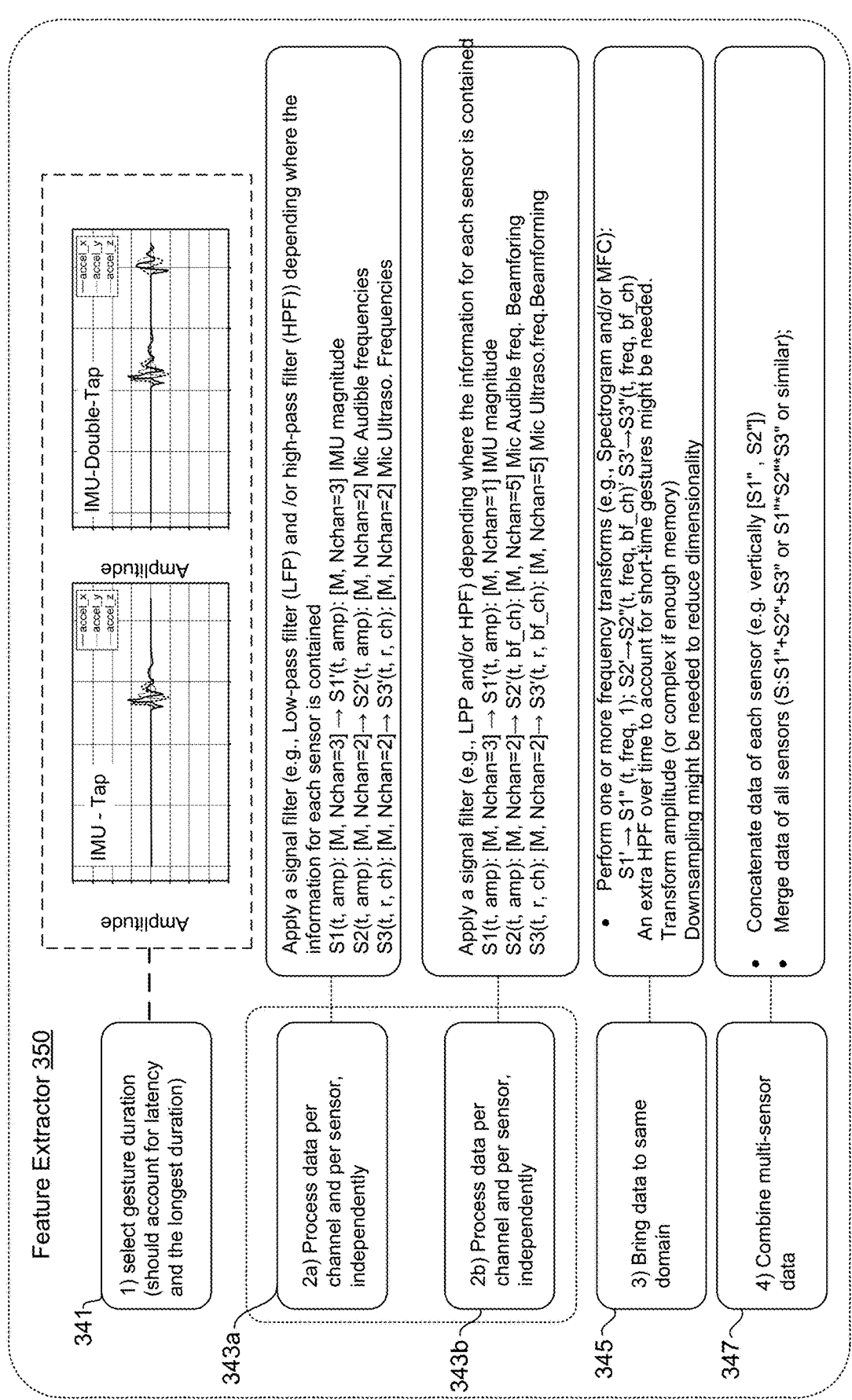

Feature Extractor 350

341 — 1) select gesture duration (should account for latency and the longest duration)

343a — 2a) Process data per channel and per sensor, independently

Apply a signal filter (e.g., Low-pass filter (LFP) and /or high-pass filter (HPF)) depending where the information for each sensor is contained
S1(t, amp): [M, Nchan=3] → S1'(t, amp): [M, Nchan=3] IMU magnitude
S2(t, amp): [M, Nchan=2]→ S2'(t, amp): [M, Nchan=2] Mic Audible frequencies
S3(t, r, ch): [M, Nchan=2] Mic Ultraso. Frequencies 343b — 2b) Process data per channel and per sensor, independently Apply a signal filter (e.g., LPP and/or HPF) depending where where the information for each sensor is contained
S1(t, amp): [M, Nchan=3] → S1'(t, amp): [M, Nchan=1] IMU magnitude
S2(t, amp): [M, Nchan=2]→ S2'(t, bf_ch): [M, Nchan=5] Mic Audible freq. Beamforing
S3(t, r, ch): [M, Nchan=2]→ S3'(t, r, bf_ch): [M, Nchan=5] Mic Ultraso.freq.Beamforming 345 — 3) Bring data to same domain

• Perform one or more frequency transforms (e.g., Spectrogram and/or MFC):
    S1' → S1''(t, freq, 1); S2'→S2''(t, freq, bf_ch)' S3'→S3''(t, freq, bf_ch)
An extra HPF over time to account for short-time gestures might be needed.
Transform amplitude (or complex if enough memory)
Downsampling might be needed to reduce dimensionality 347 — 4) Combine multi-sensor data

• Concatenate data of each sensor (e.g. vertically [S1'' , S2''])
• Merge data of all sensors (S:S1''+S2''+S3'' or S1''*S2''*S3'' or similar);

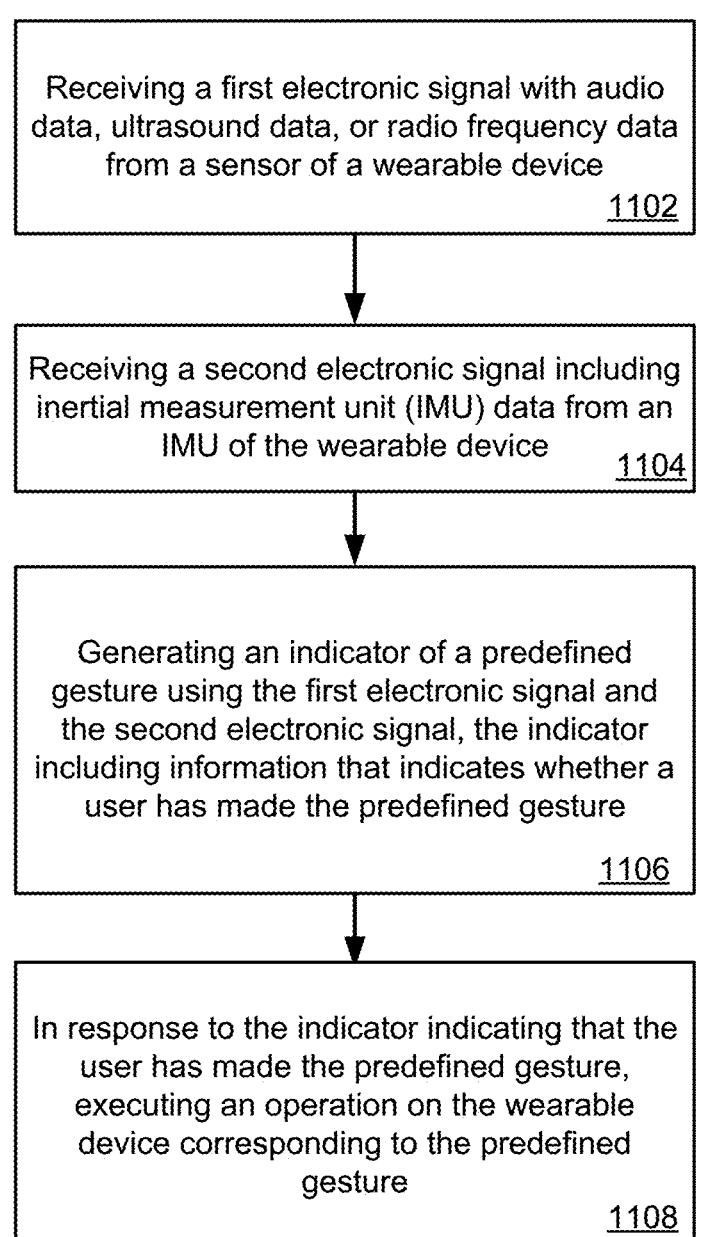

Receiving a first electronic signal with audio data, ultrasound data, or radio frequency data from a sensor of a wearable device

1102

Receiving a second electronic signal including inertial measurement unit (IMU) data from an IMU of the wearable device

1104

Generating an indicator of a predefined gesture using the first electronic signal and the second electronic signal, the indicator including information that indicates whether a user has made the predefined gesture

1106

In response to the indicator indicating that the user has made the predefined gesture, executing an operation on the wearable device corresponding to the predefined gesture

MULTI-MODAL GESTURE SENSING ON WEARABLE DEVICES

CROSS REFERENCE TO RELATED APPLICATION

This application claims priority to U.S. Provisional Application No. 63/512,371, filed Jul. 7, 2023, the contents of which are incorporated herein in their entirety.

BACKGROUND

Wearable devices such as smartglasses, smart watches, and hearables use sensors to receive input from users. A conventional wearable device may use capacitive touch sensing for receiving input from a user. For example, a swipe on the capacitive sensor may cause the wearable device to perform an action. In some examples, squeezing the frame of a smartglasses device may cause the smartglasses device to turn a display on. In some examples, swiping the face of a smart watch may cause the display to display app icons.

SUMMARY

This application is directed to a gesture detector on a wearable device that determines a gesture (e.g., a tap, double tap, a swipe, a pinch, etc.) based on input from multiple input modalities (e.g., inertial measurement unit (IMU) data, audio data, ultrasound data, and/or radio frequency (RF) data etc.). For example, a user may be wearing a hearable device (e.g., earbuds), and, in response to the user tapping their check, the gesture detector may detect the gesture (e.g., the tap) using sensor data from two or more input modalities, and the hearable device may perform an action that corresponds to the tap gesture. The gesture detector may overcome one or more technical problems relating to false positives (e.g., detection of a certain type of gesture when that gesture did not occur) by using two or more input modalities. In some examples, using IMU data in combination with audio data, ultrasound data, and/or RF data (or any combination of two or more input modalities) may increase the accuracy of detecting user gestures for controlling a wearable device. In some examples, the gesture detector may detect gestures that are not provided directly on the wearable device itself such as mid-air gestures, gestures around the wearable device such as a tap or swipe on the user's cheek or user's wrist, etc. In other words, the gesture detector may not be limited to gestures that touch the wearable device itself. The gesture detector may provide one or more technical benefits of increasing the number of gestures that can be used to control the wearable device as compared to some conventional approaches.

Some conventional wearable devices use capacitive touch sensing, which can determine whether, for example, a user has tapped on a wearable device. In some examples, capacitive touch sensing alone may lead to false positives, which can be caused by electrostatic discharge, moisture, and/or sensor drift, etc. Further, some capacitive touch sensing techniques may not be capable of detecting certain types of gestures such as directional swipes (e.g., swipe right, swipe left, swipe up, swipe down, etc.). An IMU can detect a user's motion corresponding to a gesture but used alone or with capacitive touch sensing may also lead to false positives. However, the gesture detector's use of IMU data, audio data, and/or ultrasound data from a user's execution of a gesture (e.g., tapping their cheek or wrist) may provide one or more technical benefits of improving the accuracy of gesture detection. In addition, the gesture detector discussed herein may provide one or more technical benefits of increasing the number of gestures to control a wearable device, such as the detection of directional swipes for controlling a wearable device and/or the detection of other types of gestures that are not provided directly on the wearable device. In some examples, the gesture detector discussed herein may provide one or more technical benefits of distinguishing between taps and swipes.

The gesture detector includes a technical solution that receives multi-sensor data from a sensor system associated with the wearable device and uses the multi-sensor data as inputs to a machine-learning (ML) model to generate a gesture indication, where the gesture indication includes information that indicates whether a user has made a predefined gesture. The gesture indication may be referred to as an indicator or an indicator of a predefined gesture. In some examples, the multi-sensor data includes a combination of two or more of IMU data, audio data, ultrasonic data, or radiation frequency (RF) data. In response to the gesture indication indicating that the user has made the predefined gesture, the wearable device executes an operation that corresponds to the predefined gesture.

In some aspects, the techniques described herein relate to a method including: receiving a first electronic signal with audio data, ultrasound data, or radio frequency data from a sensor of a wearable device; receiving a second electronic signal including inertial measurement unit (IMU) data from an IMU of the wearable device; generating an indicator of a predefined gesture using the first electronic signal and the second electronic signal, the indicator including information that indicates whether a user has made the predefined gesture; and in response to the indicator indicating that the user has made the predefined gesture, executing an operation on the wearable device corresponding to the predefined gesture.

In some aspects, the techniques described herein relate to a wearable device including: at least one processor; and a non-transitory computer-readable medium storing executable instructions that cause the at least one processor to execute operations, the operations including: receiving a first electronic signal with audio data, ultrasound data, or radio frequency data from a sensor of a wearable device; receiving a second electronic signal with inertial measurement unit (IMU) data from an IMU of the wearable device; generating an indicator of a predefined gesture using the first electronic signal and the second electronic signal, the indicator including information that indicates whether a user has made the predefined gesture; and in response to the indicator indicating that the user has made the predefined gesture, executing an operation on the wearable device corresponding to the predefined gesture.

In some aspects, the techniques described herein relate to a non-transitory computer-readable medium storing executable instructions that when executed by at least one processor cause the at least one processor to execute operations, the operations including: receiving a first electronic signal with audio data, ultrasound data, or radio frequency data from a sensor of a wearable device; receiving a second electronic signal with inertial measurement unit (IMU) data from an IMU of the wearable device; generating an indicator of a predefined gesture using the first electronic signal and the second electronic signal, the indicator including information that indicates whether a user has made the predefined gesture; and in response to the indicator indicating that the user has made the predefined gesture, executing an operation on the wearable device corresponding to the predefined gesture.

The details of one or more implementations are set forth in the accompanying drawings and the description below. Other features will be apparent from the description and drawings, and from the claims.

BRIEF DESCRIPTION OF THE DRAWINGS

FIG. 4 illustrates an example of a feature extractor according to another aspect.

FIG. 11 is a flow chart that illustrates an example method of performing the gesture determination according to the improved techniques described herein.

DETAILED DESCRIPTION

Figure 1B:
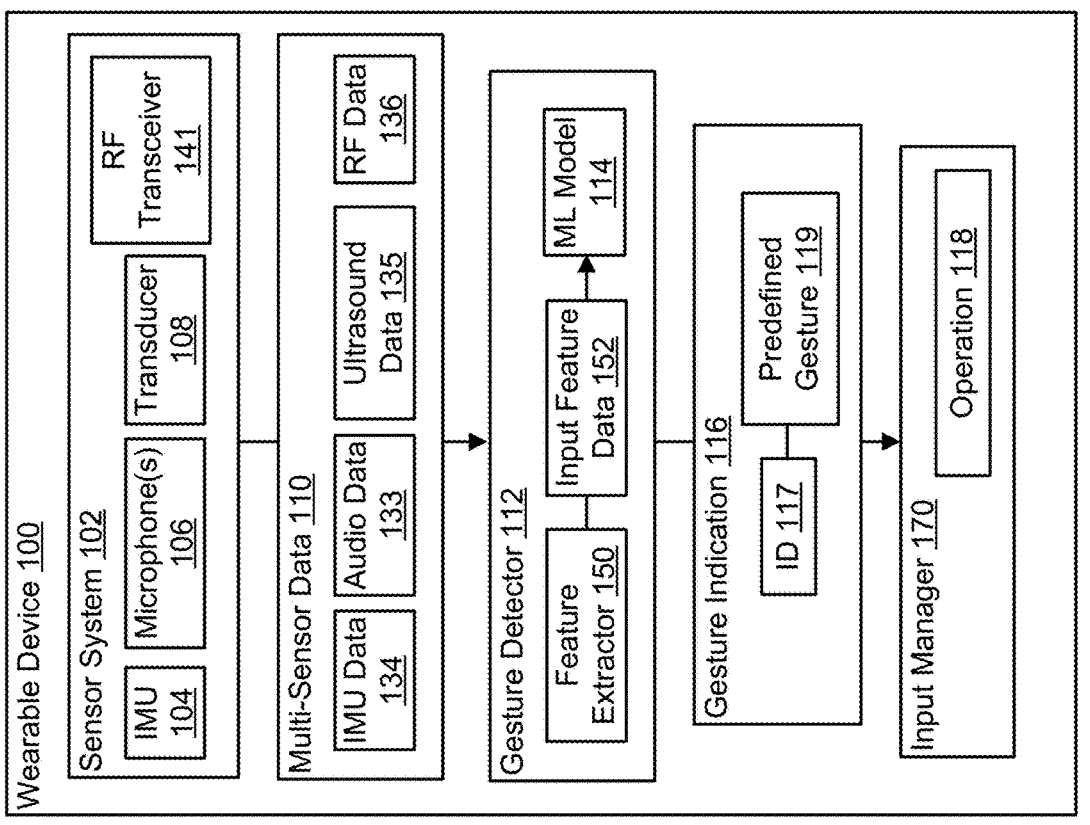
FIGS. 1A and 1B illustrate a wearable device configured to detect a gesture from multi-sensor data according to an aspect.

This disclosure relates to a wearable device that includes a gesture detector configured to generate a gesture indication (e.g., whether or not a predefined gesture has been made by a user) using multi-sensor data (e.g., sensor data from two or more input modalities) that provides one or more technical benefits of reducing false positives and/or increasing the number of gestures that can be used to control the wearable device. For example, a user may be wearing a hearable device (e.g., earbuds), and, in response to the user tapping their check, the gesture detector may detect the gesture (e.g., the tap) using multi-sensor data, and the hearable device may perform an action that corresponds to the tap gesture. In some examples, the multi-sensor data includes a combination of two or more of the IMU data, audio data, ultrasonic data, or radiation frequency (RF) data. The gesture detector may detect gestures that are not provided directly on the wearable device itself such as mid-air gestures and gestures around the wearable device such as a tap or swipe on the user's cheek or user's wrist, etc. In some examples, the gesture detector does not use capacitive touch sensing to detect a gesture. In some examples, the wearable device includes a capacitive touch sensor for detecting touch gestures and the gesture detector for detecting gestures not provided directly on the wearable device. The wearable device may be any type of device that is worn by a user such as hearables (e.g., earbuds, earphones, in-ear headphones, etc.), head-mounted display devices (e.g., augmented reality (AR) devices, virtual reality (VR) devices), wrist-worn devices (e.g., smart watches), smart jewelry, smart clothing, and/or medical wearables, etc.

Some conventional wearable devices use capacitive touch sensing to execute one or more operations. For example, squeezing the frame of a smartglasses device may cause the smartglasses device to activate its display or swiping the face of a smartwatch may cause the display to show application icons. However, capacitive touch sensing may have one or more technical problems relating to false positives, which can be caused by electrostatic discharge, moisture, and/or sensor drift, etc. Moreover, on frames for smartglasses or on eye buds or other wearable devices, capacitive touch sensing is another component to integrate and may add additional complexity and cost. In some examples, the use of capacitive sensing may have one or more technical problems relating to distinguishing between directional swipes.

The gesture detector includes a technical solution that receives multi-sensor data from a sensor system associated with the wearable device and uses the multi-sensor data as inputs to a machine-learning (ML) model to generate a gesture indication, where the gesture indication includes information that indicates whether a user has made a predefined gesture. The gesture indication may be referred to as an indicator or an indicator of a predefined gesture. In some examples, the multi-sensor data includes a combination of two or more of IMU data, audio data, ultrasonic data, or radiation frequency (RF) data. In response to the gesture indication indicating that the user has made the predefined gesture, the wearable device executes an operation that corresponds to the predefined gesture.

For example, the gesture detector may use, in addition to IMU data, audio captured by one or more microphones on a wearable device to determine whether a gesture has been made, and if so, which gesture has been made. IMU(s) may provide a first electronic signal to the gesture detector in response to detected motion. The microphone(s) may provide a second electronic signal to the gesture detector in response to detected audio resulting from a gesture. The gesture detector determines whether a gesture (e.g., a predefined gesture) has been made based at least on the first electronic signal and the second electronic signal. If the gesture detector determines that the predefined gesture was made, an input manager may perform (e.g., execute) an operation on the wearable device corresponding to the predefined gesture. Although IMU data and audio data are used in some of the implementations discussed herein, it is noted that the gesture detector may any combination of two or more input modalities such as IMU data, audio data, ultrasonic data, or RF data, or any of the other types of sensors discussed herein.

A gesture may be defined as a deliberate movement of a user's body part (e.g., the hand of a user). The gesture detector may detect a wide variety of gestures such as base gestures (e.g., pinches, taps, double taps, swipes, rubs)

and/or directional gestures (e.g., forward and backward swipes). Each gesture may have a corresponding electronic signature (e.g., feature) that identifies it to a model (e.g., a ML model).

The wearable device includes one or more IMUs. An IMU includes an accelerometer that generates IMU data (e.g., a vector signal having three components (x, y, z)). The gesture detector may form the first electronic signal by taking the magnitude of the vector signal. The gesture detector may synchronize the first electronic signal with the second electronic signal (e.g., time sync), transform the first electronic signal and the second electronic signal to a common (frequency) domain, and combine the first electronic signal and second electronic signal. In some examples, the signals are combined via concatenation.

The combined signal is then input into a model. In some examples, the model is a machine learning (ML) model. In some examples, the ML model is a neural network. In some examples, the ML model is a convolutional neural network (CNN). The model is configured to receive the combined signal as input and output a gesture indication (e.g., an identifier of a predefined gesture). The identifier can be a number, a character, or a graphic representation of the gesture.

The gesture indication (e.g., the identifier) is then used by an input manager to perform an operation on the wearable device. For example, a forward swipe on a frame of a smartglasses device may cause the input manager to scroll up in a display, while a backward swipe may cause the input manager to scroll down in the display.

The gesture detector may provide one or more technical advantages relating to the reduction of the number of false positives that result from capacitive touching or IMUs alone. For example, inputting a combined IMU and audio signal into a ML model may reduce (e.g., significantly reduce) false positives. Moreover, combining audio signals with IMU signals may provide better differentiation between directional gestures, e.g., forward and backward swipes. In some examples, the gesture detector may provide one or more technical advantages relating to the detection of gestures that are not provided directly on the wearable device itself such as mid-air gestures, and/or gestures around the wearable device such as a tap or swipe on the user's cheek or user's wrist, etc. The gesture detector may provide one or more technical benefits of increasing the number of gestures that can be used to control the wearable device as compared to some conventional approaches.

Figure 1A:
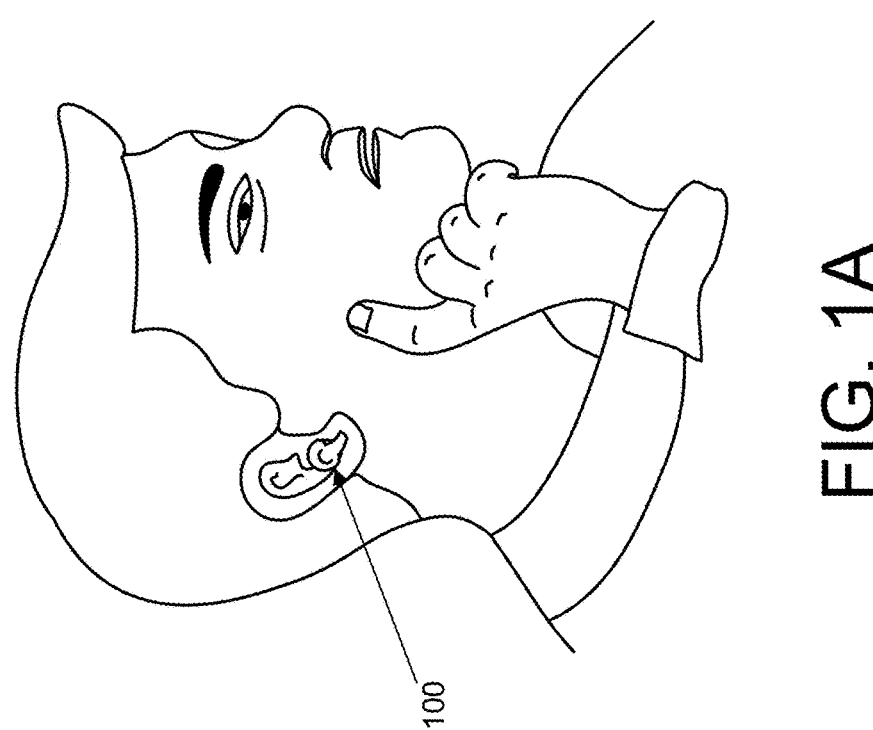

FIGS. 1A to 1F illustrate a wearable device 100 with a gesture detector 112 that uses multi-sensor data 110 to generate a gesture indication 116 that indicates whether a user has made a predefined gesture 119. The gesture indication 116 may be referred to as an indicator or an indicator of a predefined gesture. In some examples, the multi-sensor data 110 includes a combination of two or more of IMU data 134, audio data 133, ultrasonic data 135, or radio frequency (RF) data 136. In some examples, the gesture indication 116 includes an identifier 117 of a predefined gesture 119. The identifier 117 may be one or more values that represent a particular predefined gesture 119. As shown in FIG. 1A, the user is wearing a wearable device 100 (e.g., a hearable device), and, in response to the user tapping their check, the gesture detector 112 may detect a detect a tap (e.g., a predefined gesture 119) using the multi-sensor data 110. In response to the gesture indication 116 indicating that the user has made the predefined gesture 119, an input manager 170 executes an operation 118 that corresponds to the predefined gesture 119.

The wearable device 100 includes a sensor system 102. The sensor system 102 includes an inertial measurement unit (IMU) 104 configured to generate IMU data 134 about an acceleration and/or velocity of the wearable device 100. In some examples, the IMU 104 generates IMU data 134 in response to detected motion of the wearable device 100. In some examples, the IMU 104 may be referred to as a motion sensor, and the IMU data 134 may be referred to as motion data, wherein the motion data includes acceleration and/or velocity along two or three axes. The IMU 104 includes an accelerometer configured to measure an acceleration of the wearable device 100 and generate accelerometer data.

The IMU data 134 may include the IMU magnitudes and timestamps over a period of time. In some examples, the IMU data 134 is referred to as an electronic signal. In some examples, the IMU data 134 is referred to as IMU samples, where each IMU sample includes an acceleration amplitude and corresponding timestamp and/or a velocity amplitude and corresponding timestamp. In some examples, the IMU data 134 may include metadata such as information about a sample rate (referred to as a first sampling rate) (e.g., how many times per second the IMU data 134 is being sampled and converted to a digital value), a bit depth (e.g., the number of bits used to represent the amplitude (also referred to as magnitude) of each sample) and/or channel information about the number of channels (e.g., acceleration data may be considered one channel, velocity may be considered another channel, etc.).

Figure 1C:
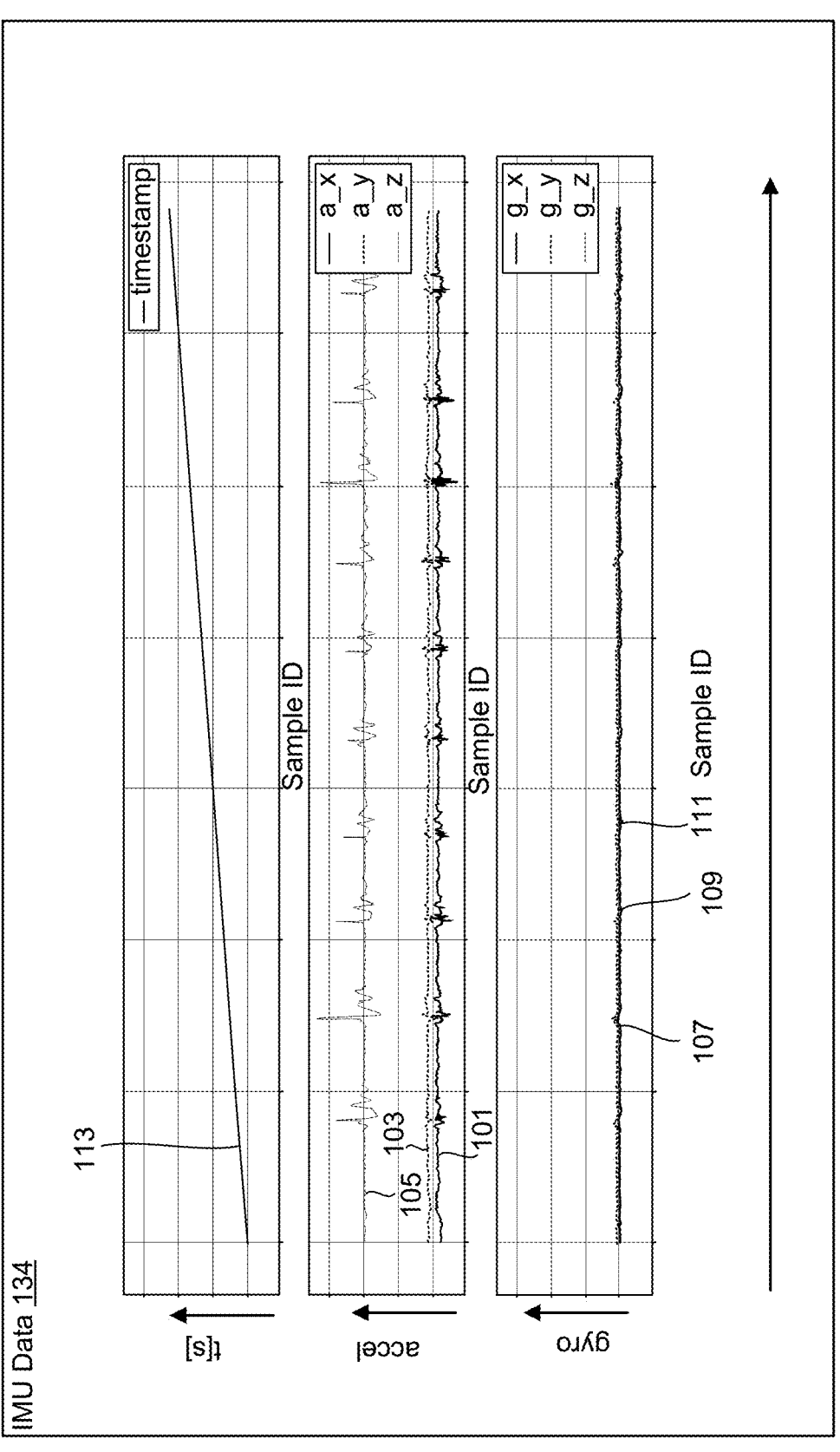
FIG. 1C illustrates an example of inertial measurement unit (IMU) data according to an aspect.

Referring to FIG. 1C, the accelerometer data includes information about the acceleration of the wearable device 100, e.g., x-direction acceleration 101 (e.g., acceleration in an x-axis), a y-direction acceleration 103 (e.g., acceleration in a y-axis), and a z-direction acceleration 105 (e.g., acceleration in a z-axis). The IMU 104 may include a gyroscope configured to measure a velocity of the wearable device 100 and generate gyroscope data. The gyroscope data includes information about the velocity of the wearable device 100, e.g., information about an x-direction velocity 107 (e.g., velocity in the x-axis), a y-direction velocity 109 (e.g., velocity in the y-axis), and a z-direction velocity 111 (e.g., velocity in the z-axis). The IMU data 134 includes time information 113 about the acceleration and/or velocity. The time information 113 may be timestamp values.

In some examples, the IMU 104 obtains the IMU data 134 according to a first sampling rate. In some examples, the IMU data 134 includes an acceleration magnitude value, a velocity magnitude value, and a corresponding timestamp for each sample. In some examples, the IMU data 134 is generated in a time domain by the IMU 104, and the gesture detector 112 converts the IMU data 134 in the time domain to IMU data 134 in a frequency domain (e.g., using one or more transforms). The IMU data 134 in the frequency domain may be visually shown by a spectrum or a spectrogram. A spectrum of IMU data 134 may refer to the distribution of its signal strength across different frequencies. A spectrogram of IMU data 134 may depict how the frequency content of the IMU data 134 (e.g., the acceleration and angular velocity) over time.

The sensor system 102 includes one or more microphones 106 configured to generate audio data 133 about the sound waves (e.g., ambient sound) around the wearable device 100. In some examples, the audio data 133 may represent the ambient sounds that are around the wearable device 100. In some examples, the sensor system 102 includes a single microphone 106. In some examples, the sensor system 102 includes multiple microphones 106 such as two, three, four, five, six, or any number greater than six. In some examples, the wearable device 100 includes a set of microphones 106, and the microphones 106 may be positioned at different locations of the wearable device 100, which may improve the performance of gesture sensing. In some examples, two external-facing mics on a hearing device (e.g., an earbud) may be vertically aligned, which may enable swipe detection in a vertical direction.

The audio data 133 includes an audio signal, and, in some examples, metadata associated with the audio signal. The audio signal may be a digital representation of the sound waves captured by the microphone(s) 106. The audio signal may include digital data that represents the amplitude of the sound at specific moments in time. In some examples, the audio data 133 is referred to as an electronic signal. In some examples, the audio data 133 is referred to as audio samples, where each audio sample includes an amplitude and corresponding timestamp. The sensor system 102 may obtain the audio data 133 according to a second sampling rate. In some examples, the audio data 133 includes audible frequencies. In some examples, the audio data 133 includes an amplitude value and a timestamp for each sample.

Figure 1D:
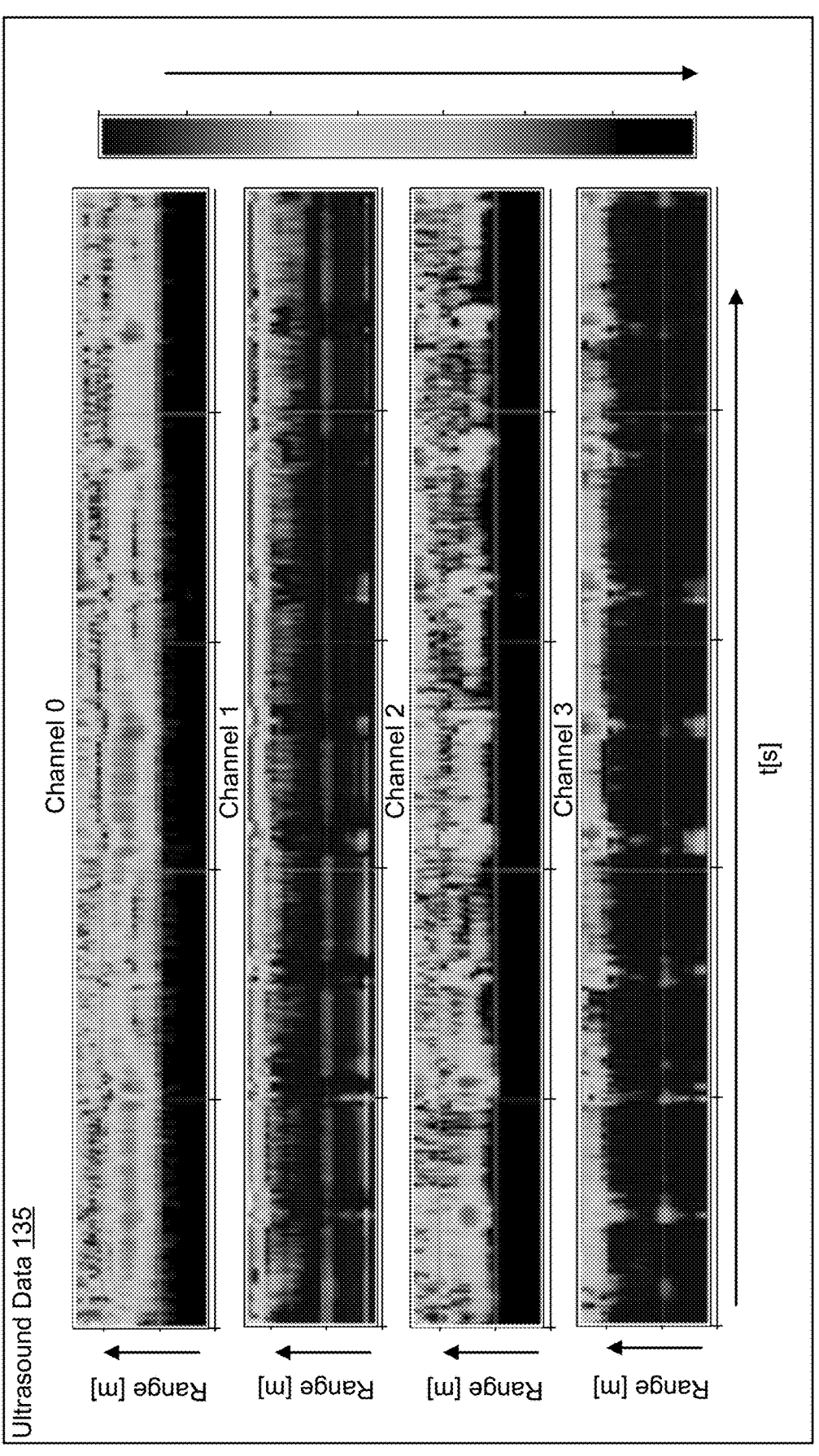
FIG. 1D illustrates an example of ultrasound data according to an aspect.
Figure 1E:
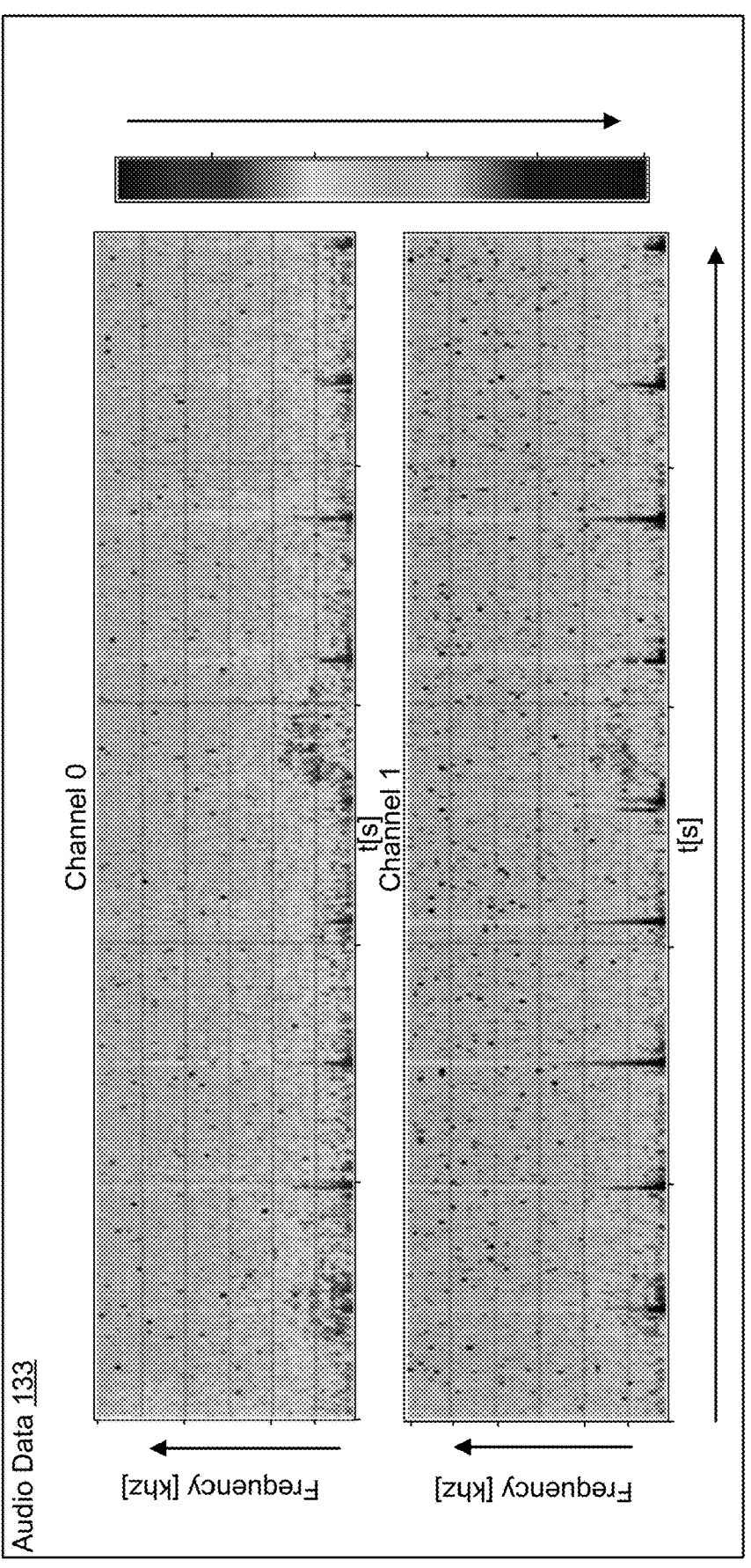
FIG. 1E illustrates an example of audio data according to an aspect.

The metadata may include information about a sample rate (referred to as a second sampling rate) (e.g., how many times per second the sound wave is being sampled and converted to a digital value), a bit depth (e.g., the number of bits used to represent the amplitude of each sample) and/or channel information about the number of channels (e.g., each microphone may be associated with a different channel, or there may be one channel representing a single microphone, or one channel representing a beamed-formed sound signal (e.g., a combination of sound waves from multiple microphones 106). In some examples, the sensor system 102 generates audio data 133 for each microphone 106, e.g., first audio data for a first microphone relating to a first channel, second audio data for a second microphone relating to a second channel, and so forth. In some examples, the audio data 133 is generated in a time domain by the microphone(s) 106, and the gesture detector 112 converts the audio data 133 in the time domain to audio data 133 in a frequency domain (e.g., using one or more transforms). The audio data 133, depicted in FIG. 1E, is in the frequency domain (e.g., a spectrogram). A spectrogram of sound waves is a visual representation of the sound's frequency content over time and may indicate pitch and/or loudness.

The sensor system 102 includes a transducer 108. In some examples, the transducer 108 is referred to as an ultrasonic frequency sensor. The transducer 108 may detect and generate ultrasound data 135. A transducer 108 may include one or more ultrasonic transmitters (e.g., speakers) and one or more ultrasonic receivers (e.g., microphones). In some examples, the transducer 108 may include a set of ultrasonic transmitters (e.g., Tx) and a set of ultrasonic receivers (e.g., Rx). In some examples, the ultrasonic transmitters and the ultrasonic receivers may be positioned at different locations on the wearable device 100, which may improve the performance of gesture sensing. The transducer 108 is configured to generate sound waves (e.g., above the range of human hearing), and the transducer 108 may generate the ultrasound data 135 from the sound signals that are reflected back at the transducer 108. The ultrasound signal may include digital data that represent the range of the ultrasound at specific moments in time. The sensor system 102 may obtain the ultrasound data 135 according to a third sampling rate. In some examples, the ultrasound data 135 includes ultrasound frequencies. In some examples, the ultrasound data 135 includes a range value and a timestamp for each sample. In some examples, the ultrasound data 135 is referred to as an electronic signal. In some examples, the ultrasound data 135 is referred to as ultrasound samples, where each ultrasound sample includes a range value and corresponding timestamp. In some examples, the ultrasound data 135 is generated in a time domain by the transducer 108, and the gesture detector 112 converts the ultrasound data 135 in the time domain to ultrasound data 135 in a frequency domain (e.g., using one or more transforms). The ultrasound data 135, depicted in FIG. 1D, is in the frequency domain (e.g., a spectrogram). A spectrogram of ultrasound data 135 is a visual representation of the ultrasound data's frequency content over time. As shown in FIG. 1D, the ultrasound data 135 includes ultrasound data's frequency content over time for a plurality of channels, where each channel corresponds to a different ultrasonic receiver (e.g., microphone).

The ultrasound data 135 may include metadata such as information about a sample rate (referred to as a third sampling rate) (e.g., how many times per second the ultrasound wave is being sampled and converted to a digital value), a bit depth (e.g., the number of bits used to represent the range of each sample) and/or channel information about the number of channels (e.g., each ultrasonic receiver (e.g., microphone) may be associated with a different channel, or there may be one channel representing a single receiver, or one channel representing a beamed ultrasound signal). In some examples, the sensor system 102 generates the ultrasound data 135 for each receiver, e.g., first ultrasound data for a first receiver relating to a first channel, second ultrasound data for a second receiver relating to a second channel, and so forth.

In some examples, the first sampling rate relating to the IMU data 134, the second sampling rate relating to the audio data 133, and the third sampling rate relating to the ultrasound data 135 are different. In some examples, the first sampling rate relating to the IMU data 134, the second sampling rate relating to the audio data 133, and the third sampling rate relating to the ultrasound data 135 are the same.

The sensor system 102 may include other sensors such as a radio frequency (RF) transceiver 141 configured to receive and/or transmit RF data 136 (e.g., RF waves). In some examples, the RF transceiver 141 is referred to as an RF sensor. The RF transceiver 141 may include one or more RF transmitters and one or more RF receivers. In some examples, the RF transceiver 141 may include a set of RF transmitters and a set of RF receivers. In some examples, the RF receivers may be positioned at different locations on the wearable device 100, which may improve the performance of gesture sensing. RF data 136 may refer to information received using electromagnetic waves within the radio frequency spectrum. In some examples, the gesture detector 112 uses the RF data 136 in combination with the IMU data 134, the audio data 133, or the ultrasound data 135 to detect a gesture. For example, movement of the user's body part (e.g., hand) around the wearable device 100 may affect the RF data 136 by causing disruptions in the RF data (e.g., a user's pinch may cause a Wi-Fi channel disruption).

The sensor system 102 may include other sensors such as a magnetometer, a depth sensor, an ambient light sensor, infrared sensor, a microwave sensor, a gravity sensor, a curve vector sensor, and/or a tomographic sensor. In some examples, the sensor system 102 may include other sensors such as electrooculography (e.g., measures the electrical potential changes around the eyes) and/or electromagnetic coils (e.g., creating a magnetic field that interacts with the eye's conductivity, recording movements). In some examples, the gesture detector 112 may use sensor data from one or more of a magnetometer, a depth sensor, an ambient light sensor, infrared sensor, a microwave sensor, a gravity sensor, a curve vector sensor, or a tomographic sensor in conjunction with one or more of the IMU data 134, the audio data 133, the ultrasound data 135, or the RF data 136.

The gesture detector 112 receives multi-sensor data 110 and generates a gesture indication 116 using the multi-sensor data 110. In some examples, the multi-sensor data 110 may include two or more of the IMU data 134, the audio data 133, the ultrasound data 135, or the RF data 136. In some examples, the multi-sensor data 110 includes the IMU data 134 and the audio data 133. In some examples, the multi-sensor data 110 includes the IMU data 134 and the ultrasound data 135. In some examples, the multi-sensor data 110 includes the IMU data 134 and the RF data 136. In some examples, the multi-sensor data 110 includes the IMU data 134, the audio data 133, and the ultrasound data 135. In some examples, the multi-sensor data 110 includes the IMU data 134, the audio data 133, the ultrasound data 135, and the RF data 136.

The gesture detector 112 includes a feature extractor 150 configured to process (e.g., time sync, apply one or more signal filters (e.g., high-pass filter, low-pass filter, apply one or more transforms to convert to a frequency domain, downsample, and/or combine etc.) the multi-sensor data 110 and provide the processed multi-sensor data 110 to a machine-learning (ML) model 114. In some examples, the processed multi-sensor data 110 is referred to as input feature data 152, which is provided to the ML model 114 for gesture classification.

The ML model 114 may generate the gesture indication 116 using the input feature data 152 (e.g., the processed multi-sensor data 110). In some examples, the feature extractor 150 may individually or collectively process the electronic signals of the IMU data 134, the audio data 133, the ultrasound data 135, and/or the RF data 136 to generate the input feature data 152. In some examples, the input feature data 152 is referred to as an electronic signal or a combined electronic signal. The combined electronic signal includes a concatenation and/or merging of one or more first electronic signals relating to the IMU data 134, one or more second electronic signals relating to the audio data 133, one or more third electronic signals relating to the ultrasound data 135, and/or one or more fourth electronic signals relating to the RF data 136. In some examples, the input feature data 152 is a feature vector that represents the multi-sensor data 110. In some examples, the feature extractor 150 may combine the IMU data 134, the audio data 133, the ultrasound data 135, and/or the RF data 136 into a single (combined) electronic signal.

In some examples, the feature extractor 150 may generate input feature data 152 from the multi-sensor data 110, and the input feature data 152 is provided to the ML model 114. The input feature data 152 may be digital data that represents the IMU data 134, the audio data 133, the ultrasound data 135, and/or the RF data 136. In some examples, the input feature data 152 may be referred to as a feature vector or input feature vector that combines and/or merges values from the IMU data 134, the audio data 133, the ultrasound data 135, and/or the RF data 136.

In some examples, the ML model 114 includes one or more neural networks. In some examples, the ML model 114 includes one or more convolutional neural networks. In some examples, the ML model 114 includes one or more transformer-based neural networks. In some examples, the ML model 114 is a neural network based system for gesture classification using data from multiple sensors. The ML model 114 may receive the input feature data 152 from the feature extractor 150 as an input and generate a gesture indication 116 as an output.

The gesture indication 116 may include information about whether a user has made a predefined gesture 119. In some examples, the gesture indication 116 may include an identifier 117 that identifies a predetermined gesture 119. The identifier 117 may be digital information that identifies a particular predefined gesture 119. For example, the ML model 114 may determine whether one of a plurality of predefined gestures 119 has been made by a user. For example, the ML model 114 may determine a gesture classification, e.g., whether the user has performed a swipe, a tap, a double tap, a swipe to the left, a swipe to the right, etc., using the input feature data 152.

Figure 1F:
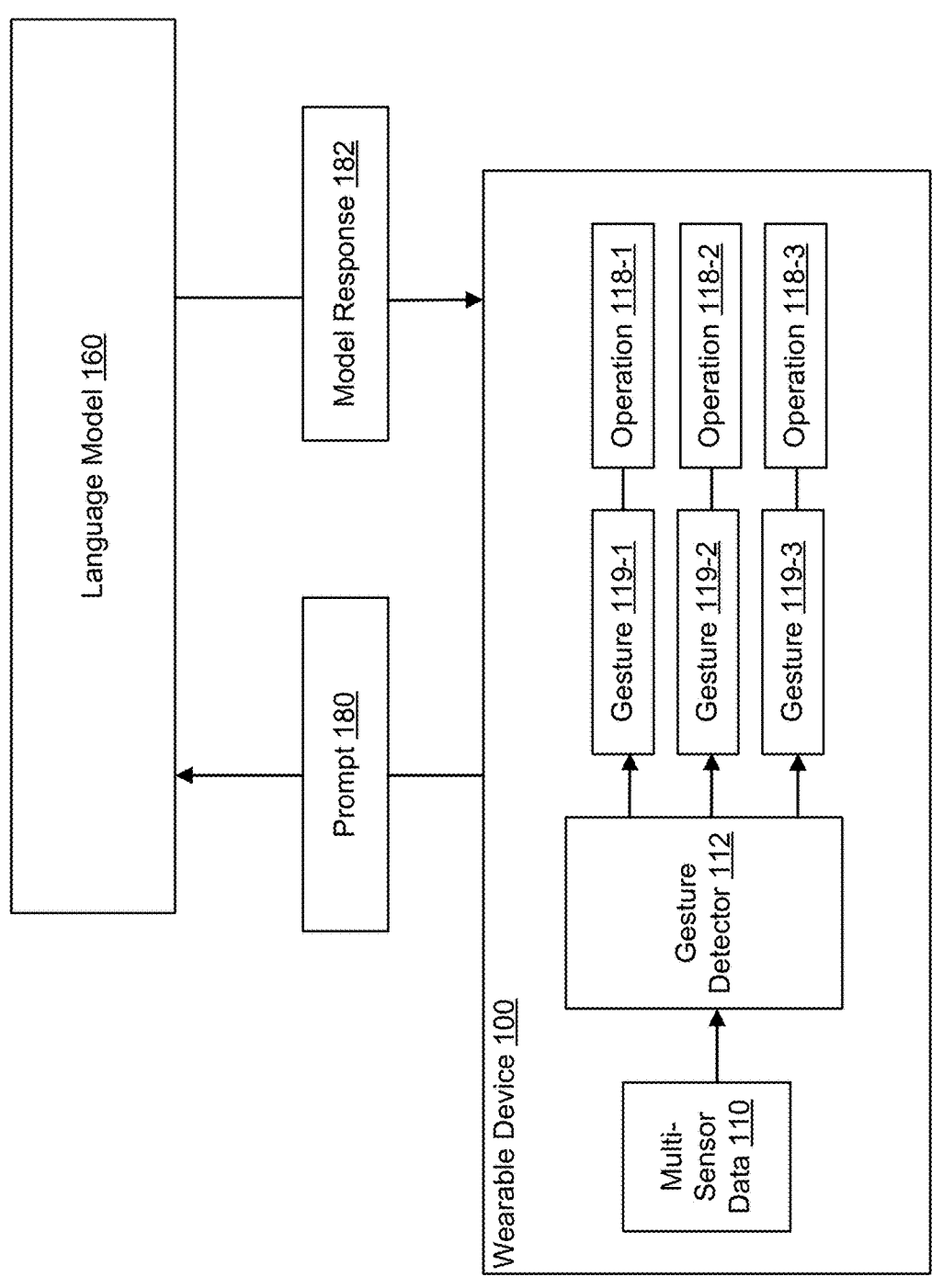
FIG. 1F illustrates an example of a wearable device communicating with a language model according to an aspect.

The wearable device 100 includes an input manager 170 that receives the gesture indication 116 and uses the identifier 117 to execute a corresponding operation 118. For example, an operation 118 may be assigned to a predefined gesture 119. As shown in FIG. 1F, in some examples, the wearable device 100 is configured to operate with a language model 160. In some examples, one or more gestures 119 may be defined to operate with the language model 160 such as a gesture 119-1, gesture 119-1, and gesture 119-3. The gesture 119-1, when detected, may cause execution of operation 118-1. The gesture 119-2, when detected, may cause execution of operation 118-2. The gesture 119-3, when detected, may cause execution of operation 118-2. The operations 118-1 through 118-3 may control the interaction with the language model 160, e.g., transmitting prompts 180 to the language model 160 and/or receiving model responses 182 from the language model 160.

In some examples, a pinching gesture may relate to invoking a language model 160, and, when the pinching gesture is detected by the gesture detector 112, the input manager 170 may initiate an operation 118-1 to enable a user to create a prompt 180 to be submitted to the language model 160. In some examples, swiping (down or up) may relate to confirming a model response 182, and, when the swiping (down or up) gesture is detected by the gesture detector 112, the input manager 170 may initiate an operation 118-2 to confirm the model response 182. In some examples, swiping (left or right) may relate to rejecting a model response 182, and, when the swiping (left or right) gesture is detected by the gesture detector 112, the input manager 170 may initiate an operation 118-3 to reject the model response 182.

Figure 2:
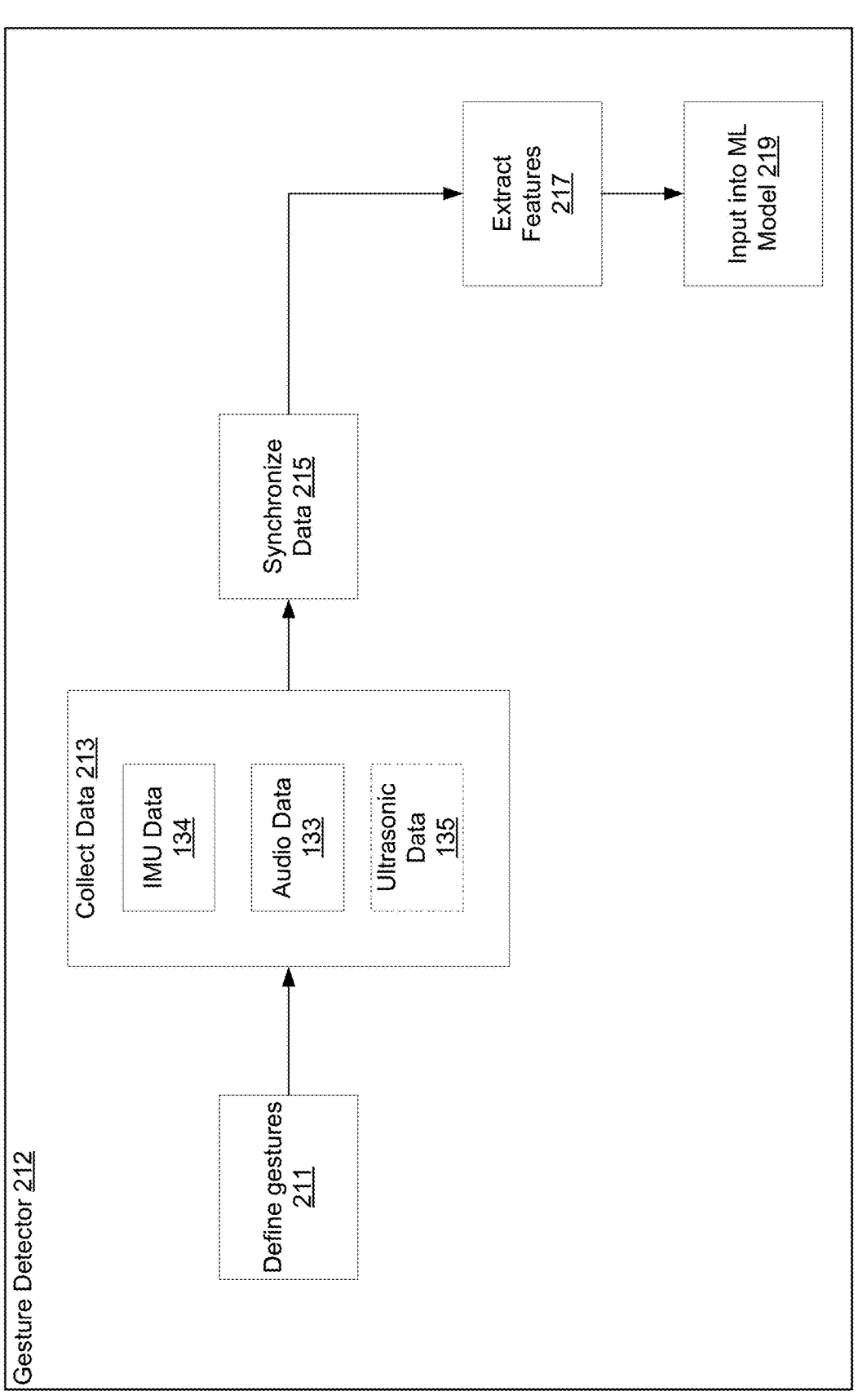
FIG. 2 illustrates an example of a gesture detector according to an aspect.

FIG. 2 illustrates an example of a gesture detector 212 for determining a gesture from multi-sensor data (e.g., IMU and at least one of audio signals or ultrasound signals, or any two input modalities described herein). The gesture detector 212 may be an example of the gesture detector 112 of FIGS. 1A to 1F and may include any of the details discussed with reference to those figures.

In operation 211, gestures (e.g., predefined gestures 119 of FIGS. 1A to 1F) are defined in memory, and, in some examples, mapped to specific operations (e.g., (e.g., operations 118 of FIGS. 1A to 1F) on a wearable device (e.g., wearable device 100 of FIGS. 1A to 1F). In memory, the gestures are represented by an output (e.g., gesture indication 116 of FIGS. 1A to 1F) from a model (e.g., the ML model 114 of FIGS. 1A to 1F). Each gesture is associated with an identifier (e.g., the identifier 117 of FIGS. 1A to 1F).

In operation 213, the gesture detector 112 receives multi-sensor data, including IMU data 134 and audio data 133. Although the IMU data 134 and the audio data 133 are used for gesture classification in some examples, it is noted that the multi-sensor data may include any two or more input modalities discussed herein. In some examples, the gesture detector 112 receives the IMU data 134, the audio data 133, and the ultrasound data 135. For example, the microphone(s) (e.g., the microphone(s) 106 of FIGS. 1A to 1F) may generate audio data 133 (e.g., a first electronic signal). The IMU (e.g., the IMU 104 of FIGS. 1A to 1F) may generate IMU data 134 (e.g., a second electronic signal).

It is noted that the first electronic signal and the second electronic signal are sampled by a processing circuitry (e.g., a processing circuitry 820 of FIG. 8) by one or more sample rates. Accordingly, the first electronic signal and the second electronic signal are vectors of values over a temporal range. In some examples, the temporal range is about 250 milliseconds but can be 500 milliseconds, 1 second, or more. A duration of 250 milliseconds may correspond to a gesture of long duration, e.g., a directional swipe. In some examples, the set of microphones can produce an additional (e.g., third) electronic signal corresponding to ultrasonic frequencies. Such an additional electronic signal can provide redundancy to the other electronic signals and further increase the accuracy of the gesture determination.

In operation 215, the gesture detector 112 may synchronize the multi-sensor data. For example, the times corresponding to the sampled values of the IMU data 134 (e.g., first electronic signal) and audio data (e.g., second electronic signal) are aligned so that the gesture characteristics, if present, (e.g., spikes in the signal amplitude) occur at the same times. In some examples, the various components of the signals (e.g., (x,y,z) for IMU signals and signals from multiple microphones) are synchronized in a similar fashion.

In operation 217, the gesture detector 112 extracts features to generate input feature data (e.g., the input feature data 152 of FIGS. 1A to 1F) from the multi-sensor data 110. For example, the feature extractor 150 may process the IMU data 134 and the audio data 133 (and, in some examples, the ultrasonic data 135) to generate the input feature data. Processing the IMU data 134 and the audio data 133 (and, in some examples, the ultrasonic data 135) to generate features that represent the multi-sensor data 110 may include applying a signal filter (e.g., a low-pass filter and/or a high-pass filter) to the IMU data 134 and the audio data 133, converting the IMU data 134 and the audio data 133 to a frequency domain (e.g., the same frequency domain) by applying one or more transforms to the multi-sensor data, executing a downsampling operation to reduce dimensionality, and/or combine (e.g., concatenate, merge) the multi-sensor data.

In operation 219, the gesture detector 112 inputs the input feature data to a model (e.g., the ML model 114 of FIGS. 1A to 1F). In some examples, the ML model is a convolutional neural network (CNN). The model is configured to take the input feature data as input and return an identifier (e.g., identifier 117 of FIGS. 1A to 1F) of a predefined gesture 119 as output. In some examples, the model is a supervised model and is trained using features corresponding to known gestures.

Figure 3:
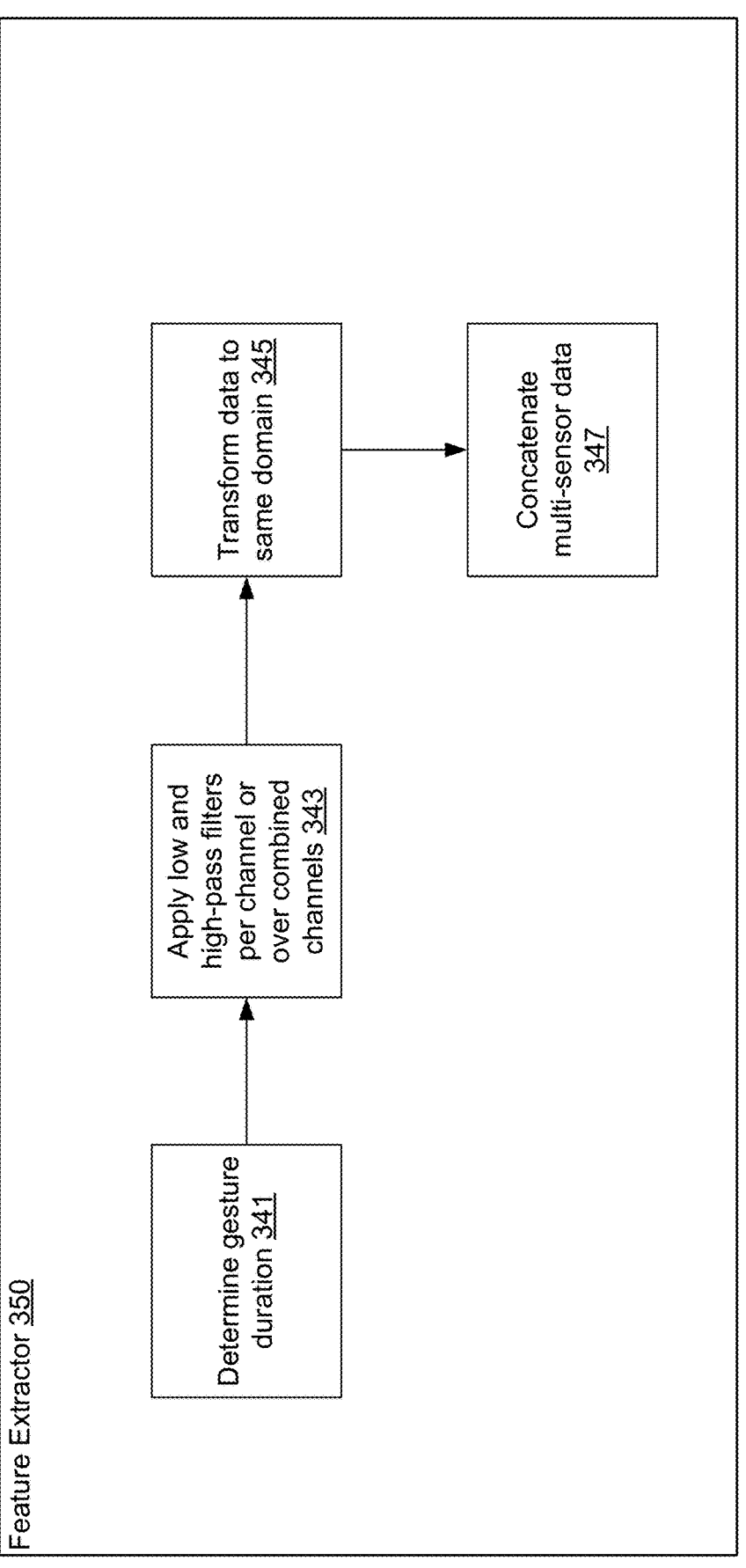
FIG. 3 illustrates an example of a feature extractor according to an aspect.

FIGS. 3 and 4 illustrate an example of a feature extractor 350 according to an aspect. The feature extractor 350 may be an example of the feature extractor 150 of FIGS. 1A to 1F and may include any of the details discussed with reference to those figures. The feature extractor 350 may generate input feature data from the multi-sensor data and the input feature data is used as input to a ML model. In some examples, the feature extractor 350 may depict example operations for operation 217 of FIG. 2.

Referring to FIGS. 3 and 4, in operation 341, the feature extractor 350 estimates (e.g., selects) a gesture duration based on the multi-sensor data (e.g., the IMU data 134 and the audio data 133, and, in some examples, the ultrasonic data 135). The feature extractor 350 may analyze the synchronized signals and determine the length of the sample size to use for gesture classification based on the values (e.g., the amplitudes) of the signal samples. For example, a directional swipe may have a duration above a threshold level (e.g., greater than 100 milliseconds, greater than 150 milliseconds, greater than 200 milliseconds, etc), and a tap may have a duration below a threshold level (e.g., less than 100 milliseconds, less than 75 milliseconds, etc.).

The feature extractor 350 may determine a gesture duration based on changes in the amplitudes of the IMU data 134 and the audio data 133. In some examples, the feature extractor 350 may determine one or more spikes (e.g., rapid increases) in the amplitudes of the IMU data 134 and/or audio data 133 during one or more time periods and select a gesture duration that encompasses the spikes in amplitudes. In some examples, the feature extractor 350 may select one of a plurality of pre-set gesture durations based on the changes in amplitudes of the IMU data 134 and/or the audio data 133.

Referring to FIG. 3, in operation 343, the feature extractor 350 may process the multi-sensor image data by applying a signal filter (e.g., a low and/or a high-pass filter) to the multi-sensor data. A signal filter may manipulate the frequency content of a signal. A low-pass filter allows signals with frequencies below a certain cutoff frequency to pass through, while reducing the amplitude (strength) of signals with frequencies above the cutoff frequency. A high-pass filter allows signals with frequencies above a certain cutoff frequency to pass through, while attenuating signals with frequencies below the cutoff frequency. In some examples, referring to FIG. 4, the channels may be processed individually, as shown by operation 343a. In some examples, referring to FIG. 4, the channels may be collectively, as shown by operation 343b.

In some examples, a channel may be referred to as an electronic signal. For example, the IMU data may include an electronic signal with samples of acceleration amplitudes and timestamps in an x-direction, an electronic signal with samples of acceleration amplitudes and timestamps in a y-direction, an electronic signal with samples of acceleration amplitudes and timestamps in a z-direction, an electronic signal with samples of velocity amplitudes and timestamps in an x-direction, an electronic signal with samples of velocity amplitudes and timestamps in a y-direction, and an electronic signal with samples of velocity amplitudes and timestamps in a z-direction. The audio data may include an electronic signal with samples of amplitudes and timestamps for a first microphone, an electronic signal with samples of amplitudes and timestamps for a second microphone and so forth. The ultrasound data may include an electronic signal with samples of ranges and timestamps for a first microphone, an electronic signal with samples of ranges and timestamps for a second microphone, and so forth.

In operation 343a, the feature extractor 350 may apply a signal filter (e.g., a high pass filter and/or a low pass filter) to each channel. For the case of separate component signals (e.g., multi-channel in which the x, y, and z components of the IMU signal are not combined), the signal filters (e.g., the low and high-pass filters) are applied to each component (channel) separately. For example, the feature extractor 350 may apply a signal filter (e.g., a low-pass filter or a high-pass filter) to each channel of the IMU data 134, may apply a signal filter (e.g., a low-pass filter or a high-pass filter) to each channel of the audio data 133, and may apply a signal filter (e.g., a low pass filter or a high-pass filter) to each channel of the ultrasound data 136.

In operation 343b, for the case of combined components (e.g., magnitude of vector IMU signal), the signal filters (e.g., the low and high-pass filters) are applied to the magnitude of the vector signals. For example, the feature extractor 350 may apply a signal filter (e.g., a low-pass filter or a high-pass filter), collectively, to the channels of the IMU data 134, may apply a signal filter (e.g., a low-pass filter or a high-pass filter), collectively, to the channels of the audio data 133, and may apply a signal filter (e.g., a low-pass filter or a high-pass filter), collectively, to the channels of the ultrasound data 136. Whether a low or high-pass filter is applied depends on where the information for each sensor is contained.

In operation 345, the feature extractor 350 transforms the filtered multi-sensor data to the same domain (e.g., a frequency domain). In some examples, the IMU data 134, the audio data 133, and the ultrasound data 136 are generated in the time domain. In some examples, the feature extractor 350 may convert the IMU data 134, the audio data 133, and the ultrasound data 136 in the time domain to a frequency domain. In some examples, the feature extractor 350 converts the multi-sensor data from the time domain to the frequency domain using one or more transforms (e.g., executing a spectrogram and/or MFC transform). In some examples, the feature extractor 350 applies an additional high-pass filter to the multi-sensor data in the frequency domain. In some examples, the feature extractor 350 applies a downsampling operation on the IMU data 134.

Referring to FIGS. 3 and 4, in operation 347, the feature extractor 350 combines the filtered IMU data 134, the audio data 133, and the ultrasound data 135 in the frequency domain to form the input feature data. In some examples, the feature extractor 350 may concatenate data of each sensor. In some examples, the feature extractor 350 may merge the data of the sensors.

Figure 5:
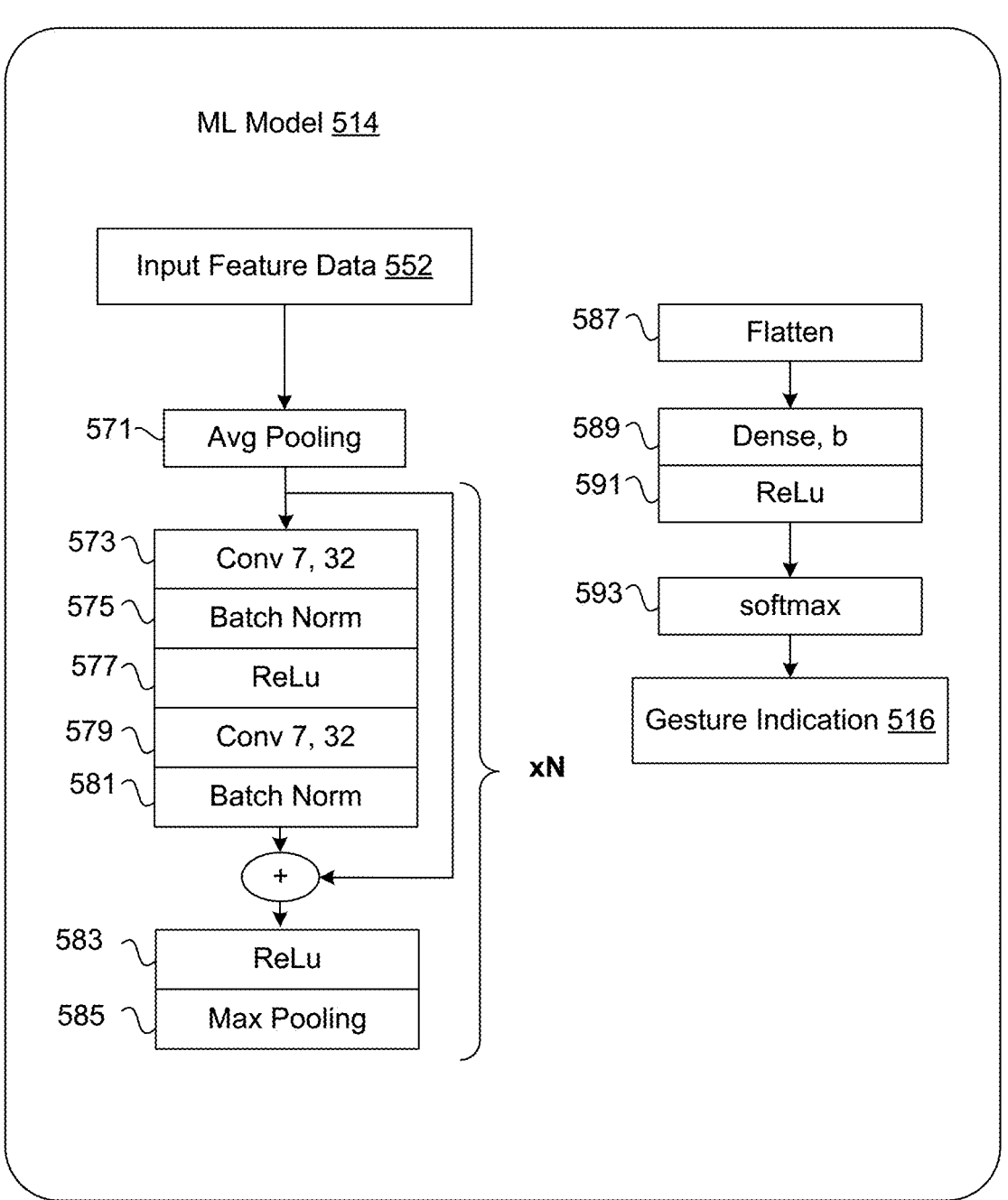
FIG. 5 illustrates an example of a machine-learning (ML) model according to an aspect.

FIG. 5 illustrates an example of a ML model 514 for generating a gesture indication 516 using input feature data 552 that represents multi-sensor data from multiple sensors. The ML model 514 may include a plurality of layers such as an average pooling layer 571, a convolutional layer 573, a batch norm layer 575, a ReLu layer 577, a convolutional layer 579, a batch norm layer 581. The input feature data 552 may be applied to the average pooling layer 571, and the output of the average pooling layer 571 may be provided to the convolutional layer 573, and then to the next layer, and then to the next layer and so forth. Activation of layers 573 to 581 may occur a number of times (e.g., four, five, six, seven times, etc.) and the results summed together. The ML model 514 may include a ReLu layer 583, a max pooling layer 585, a flatten layer 587, a dense layer 589, a RelU layer 591, and a softmax layer. The summed results are provided to the ReLu layer 583 and propagated through the layers, where the output of the softmax layer 593 provides the gesture indication 516.

Figure 6:
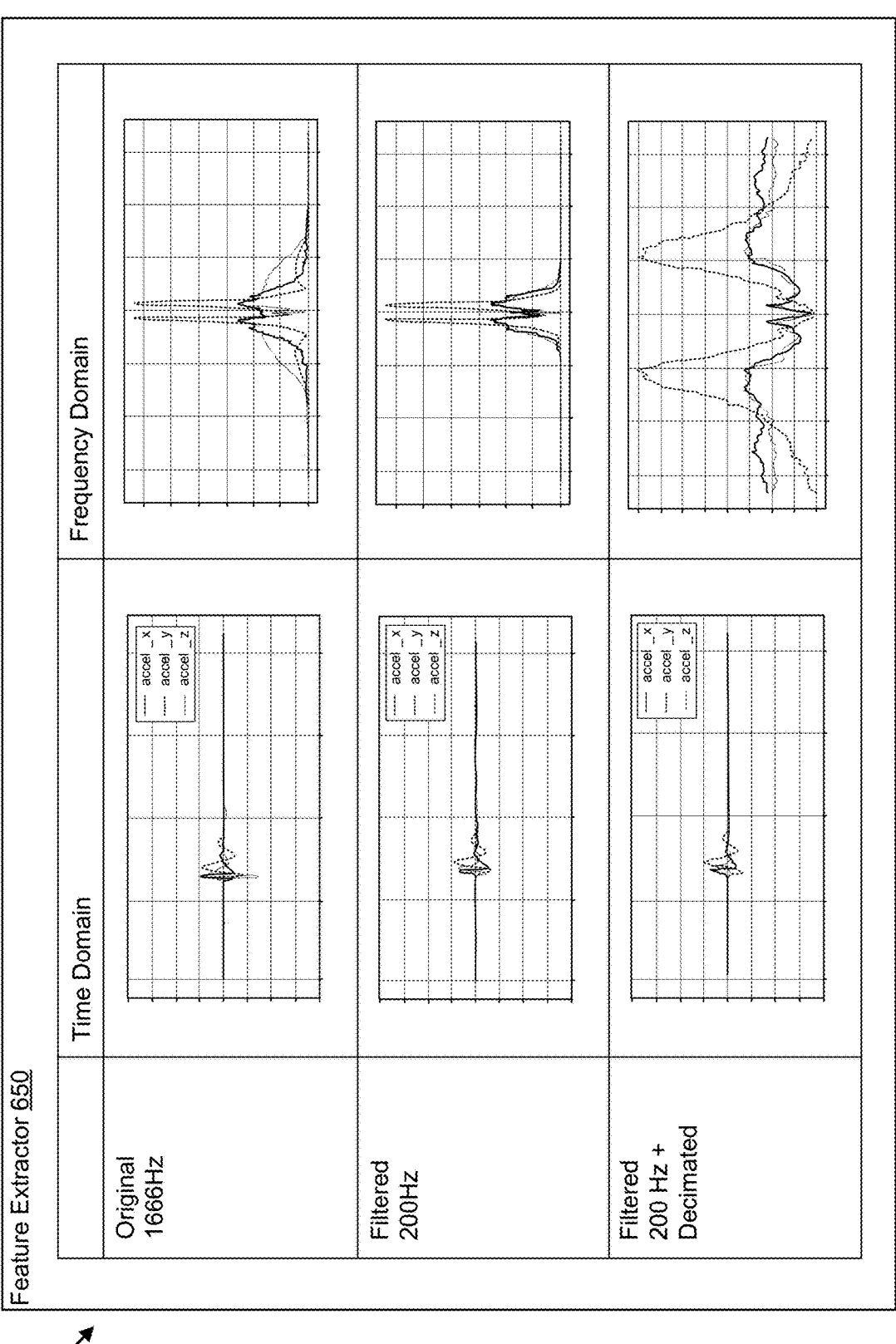
FIG. 6 illustrates an example of a feature extractor according to an aspect.

FIG. 6 illustrates a downsampling operation of a feature extractor 650. The feature extractor 650 may be an example of the feature extractor 150 of FIGS. 1A to 1F and may include any of the details discussed with reference to those figures. In some examples, the feature extractor 650 may apply the downsampling operation to IMU data 634. In some examples, the IMU data 634 may have an original frequency, and the feature extractor 650 may filter the IMU data 634 to have a lower frequency. Then, the feature extractor 650 may decimate the IMU data 634 (e.g., reduce a sampling rate of the IMU data 634).

Figure 7:
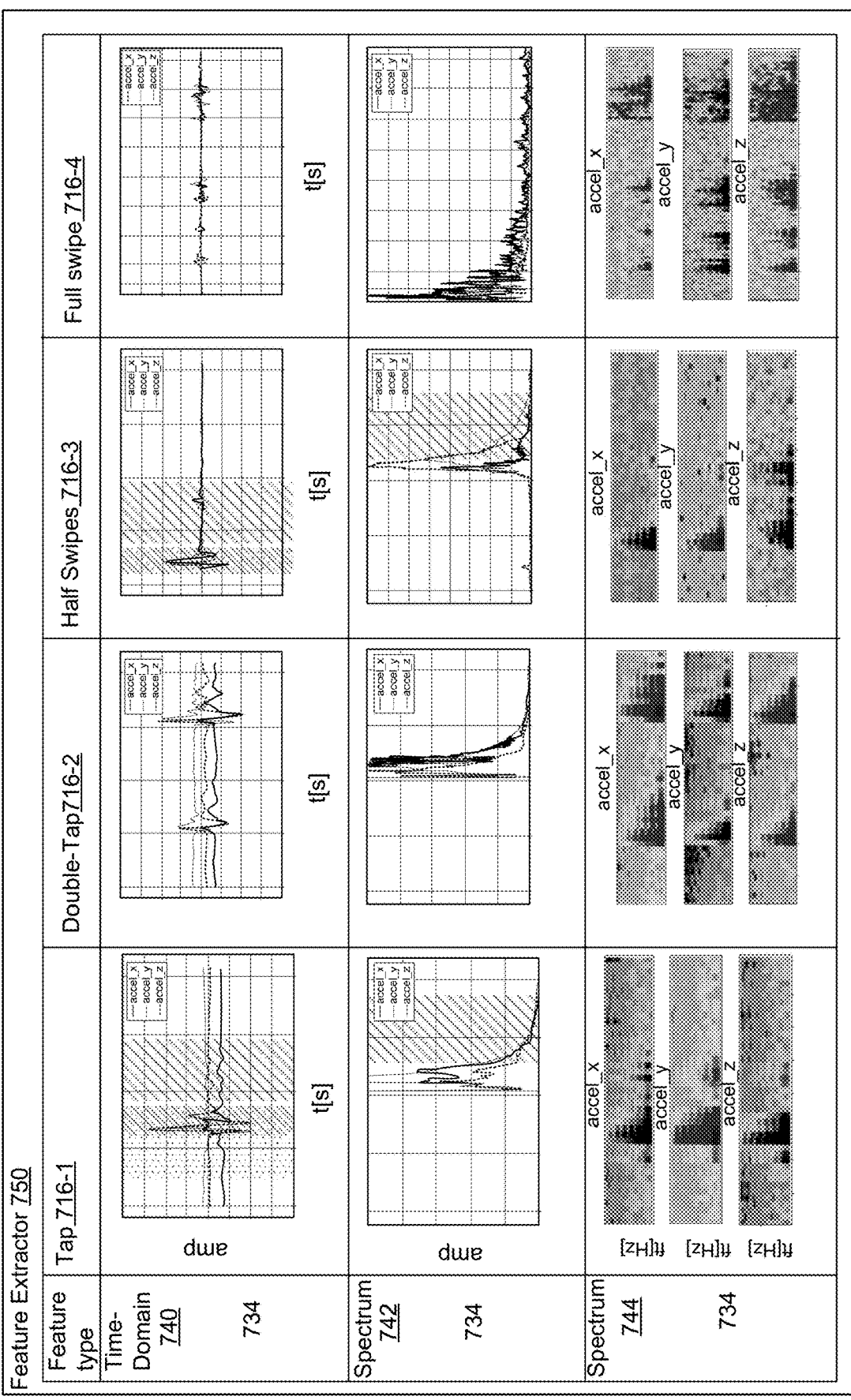
FIG. 7 illustrates an example of a feature extractor according to another aspect.

FIG. 7 illustrates an example of a feature extractor 750 configured to convert IMU data 734 from a time domain 740 to a frequency domain (e.g., spectrum domain 742 or a spectrogram domain 744) using one or more transforms. FIG. 7 illustrates the IMU data 734 in a plurality of domains (e.g., time-domain 740, a spectrum domain 742, a spectrogram domain 744) for a plurality of different types of gestures (e.g., tap gesture 716-1, double tap gesture 716-2, half swipe gesture 716-3, a full swipe gesture 716-4).

Figure 8:
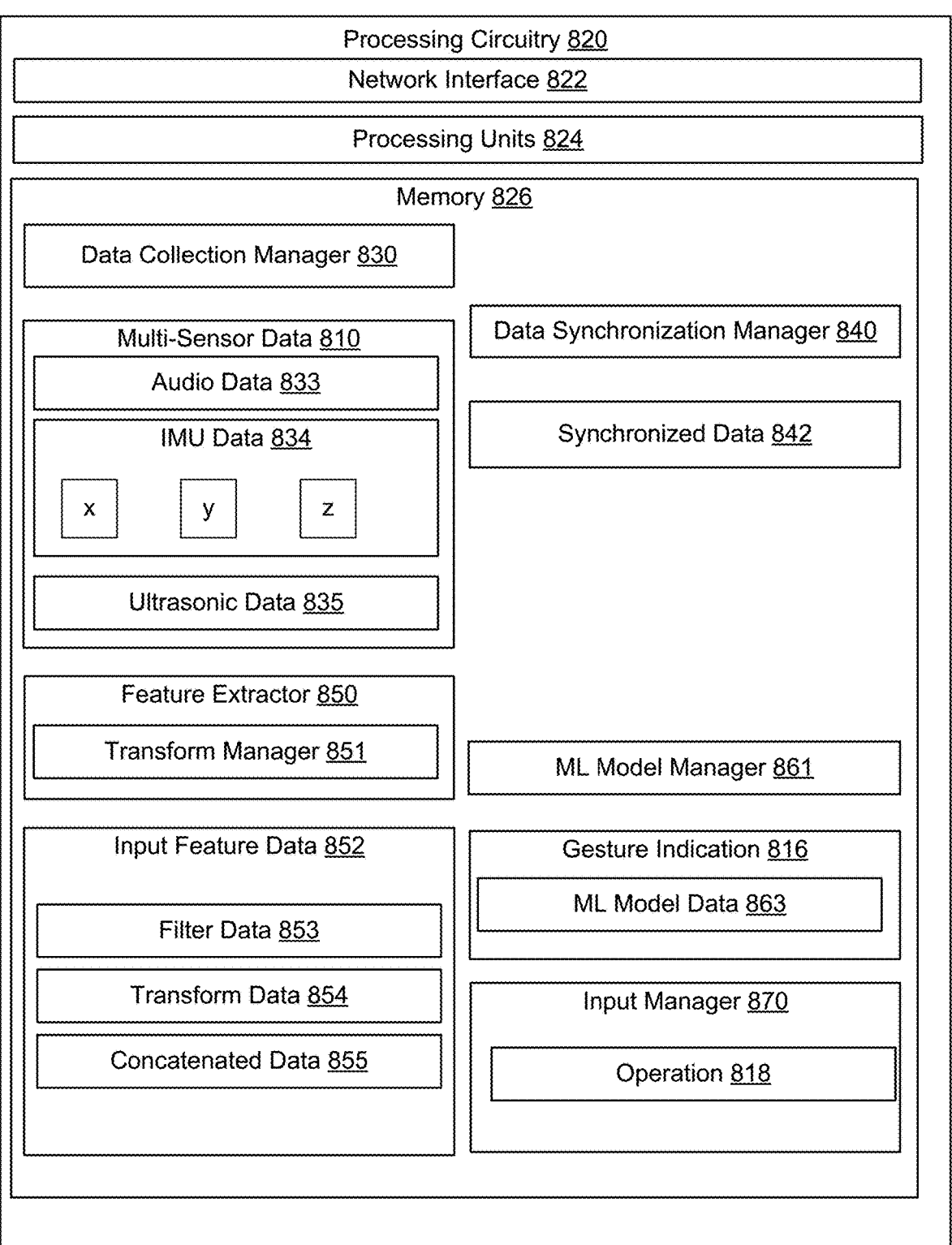
FIG. 8 illustrates an example of a processing circuitry that is used to execute the gesture detector according to an aspect.

FIG. 8 is a diagram that illustrates an example electronic environment for a gestor detector (e.g., the gestor detector 112 of FIGS. 1A to 1F) for generating a gesture indication based on multi-sensor data. A processing circuitry 820 includes a network interface 822, one or more processing units 824, and non-transitory memory (storage medium) 826.

In some examples, one or more of the components of the processing circuitry 820 can be, or can include processors (e.g., processing units 824) configured to process instructions stored in the memory 826 as a computer program product. Examples of such instructions as depicted in FIG. 8 include signal collection manager 830, signal synchronization manager 840, feature extractor 850, ML model manager 861, and an input manager 870. Further, as illustrated in FIG. 8, the memory 826 is configured to store various data, which is described with respect to the respective services and managers that use such data.

The signal collection manager 830 is configured to receive signals from the various sensors on the wearable device and produce multi-sensor data 810 (e.g., collected signal data) (e.g., multi-sensor data 110 of FIGS. 1A to 1F). The multi-sensor data 810 represent samples of the collected signals; the samples are taken at a frequency. The sensors generating the signals may be microphones and an IMU. The multi-sensor data 810 includes audio data 833 that was generated by the set of microphones and IMU data 834 that was generated by an IMU, in response to a detected motion of a gesture. The IMU data 834, as shown in FIG. 8, has three components (x,y,z). In some examples, the multi-sensor data 810 includes ultrasonic data 835, generated by microphones.

The signal synchronization manager 840 is configured to produce synchronized signal data 842 by synchronizing the audio data 833 and the IMU data 834. Specifically, the times corresponding to the sampled values of the audio data 833 (e.g., first electronic signal) and the IMU data 834 (e.g., second electronic signal) are aligned so that the gesture characteristics, if present, (e.g., spikes in the signal amplitude) occur at the same times. In some examples, the processing units 824 synchronize an amplitude of the IMU data 834 (e.g., a square root of the sum of the squares of the components).

The feature extractor 850 is configured to generate input feature data 852 for input into a ML engine. As shown in FIG. 8, the feature extractor 850 includes a transform manager 851. The feature extractor 850 is configured to apply a signal filter (e.g., a low or high-pass filter) to the synchronized signal data 842 to produce filtered data 853. The transform manager 851 then applies a frequency transform to the filtered data 853 to produce transformed data 854. In some implementations, the transformed data 854 takes the form of a spectrogram. In some implementations, the transformed data 854 takes the form of a mel-frequency cepstrum. The feature extractor 850 then concatenates (e.g., vertically concatenates) the transformed data to produce the concatenated data 855.

The ML model manager 861 is configured to take the concatenated data 855 of the input feature data 852 as input and produce a gesture indication 816 as output. The ML model controlled by the ML model manager 861 is defined by ML model data 863, with the gesture indication 816 being an output layer of the ML model. An input manager 870 is configured to perform an operation 818 on the wearable device according to the predefined gesture identified in the gesture indication 816.

The components (e.g., modules, processing units 824) of processing circuitry 820 can be configured to operate based on one or more platforms (e.g., one or more similar or different platforms) that can include one or more types of hardware, software, firmware, operating systems, runtime libraries, and/or so forth. In some implementations, the components of the processing circuitry 820 can be configured to operate within a cluster of devices (e.g., a server farm). In such an implementation, the functionality and processing of the components of the processing circuitry 820 can be distributed to several devices of the cluster of devices.

The components of the processing circuitry 820 can be, or can include, any type of hardware and/or software configured to process private data from a wearable device in a split-compute architecture. In some implementations, one or more portions of the components shown in the components of the processing circuitry 820 in FIG. 8 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some examples, one or more portions of the components of the processing circuitry 820 can be, or can include, a software module configured for execution by at least one processor (not shown). In some implementations, the functionality of the components can be included in different modules and/or different components than those shown in FIG. 8, including combining functionality illustrated as two components into a single component.

The network interface 822 includes, for example, wireless adaptors, and the like, for converting electronic and/or optical signals received from the network to electronic form for use by the processing circuitry 820. The set of processing units 824 include one or more processing chips and/or assemblies. The memory 826 includes both volatile memory (e.g., RAM) and non-volatile memory, such as one or more ROMs, disk drives, solid state drives, and the like. The set of processing units 824 and the memory 826 together form processing circuitry, which is configured and arranged to carry out various methods and functions as described herein.

Although not shown, in some implementations, the components of the processing circuitry 820 (or portions thereof) can be configured to operate within, for example, a data center (e.g., a cloud computing environment), a computer system, one or more server/host devices, and/or so forth. In some implementations, the components of the processing circuitry 820 (or portions thereof) can be configured to operate within a network. Thus, the components of the processing circuitry 820 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the processing circuitry 820 can be, or can include, processors configured to process instructions stored in a memory. For example, signal collection manager 830 (and/or a portion thereof), signal synchronization manager 840 (and/or a portion thereof), feature extractor 850 (and/or a portion thereof), ML model manager 861 (and/or a portion thereof), and input manager 870 (and/or a portion thereof) are examples of such instructions.

In some implementations, the memory 826 can be any type of memory such as a random-access memory, a disk drive memory, flash memory, and/or so forth. In some implementations, the memory 826 can be implemented as more than one memory component (e.g., more than one RAM component or disk drive memory) associated with the components of the processing circuitry 820. In some implementations, the memory 826 can be a database memory. In some implementations, the memory 826 can be, or can include, a non-local memory. For example, the memory 826 can be, or can include, a memory shared by multiple devices (not shown). In some implementations, the memory 826 can be associated with a server device (not shown) within a network and configured to serve the components of the processing circuitry 820. As illustrated in FIG. 8, the memory 826 is configured to store various data, including multi-sensor data 810, synchronized signal data 842, input feature data 852, and ML model data 863.

Figure 9A:
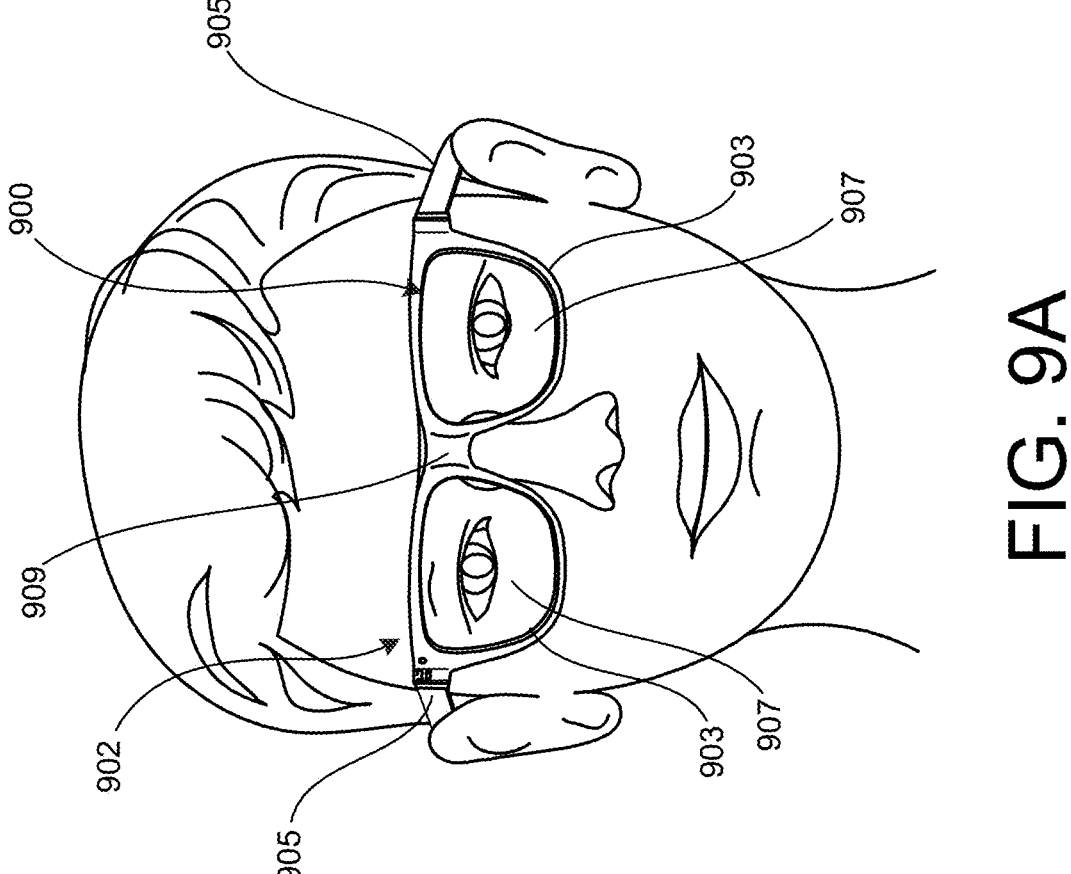
FIG. 9A illustrates an example of a head mounted wearable device according to an aspect.
Figure 9B:
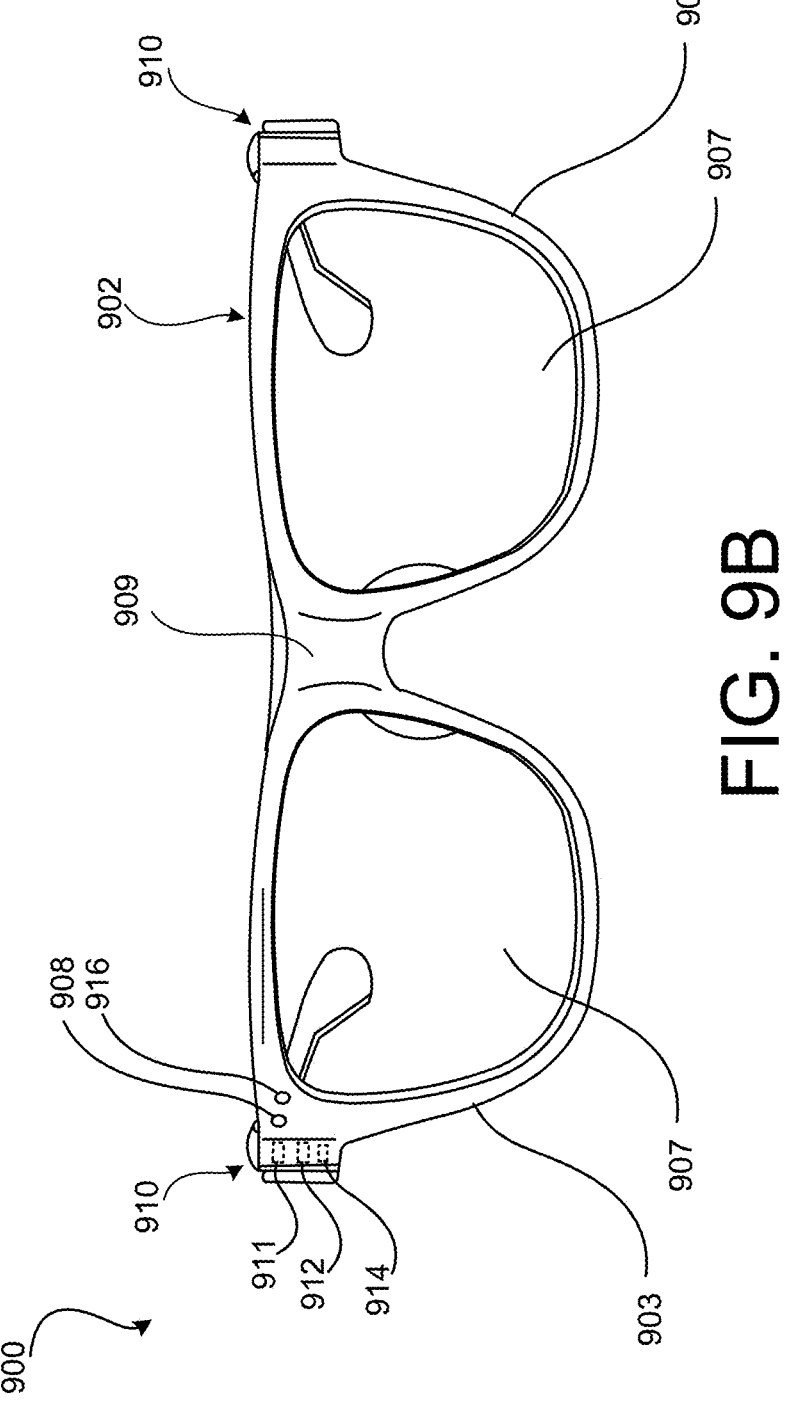
FIG. 9B is a front view.
Figure 9C:
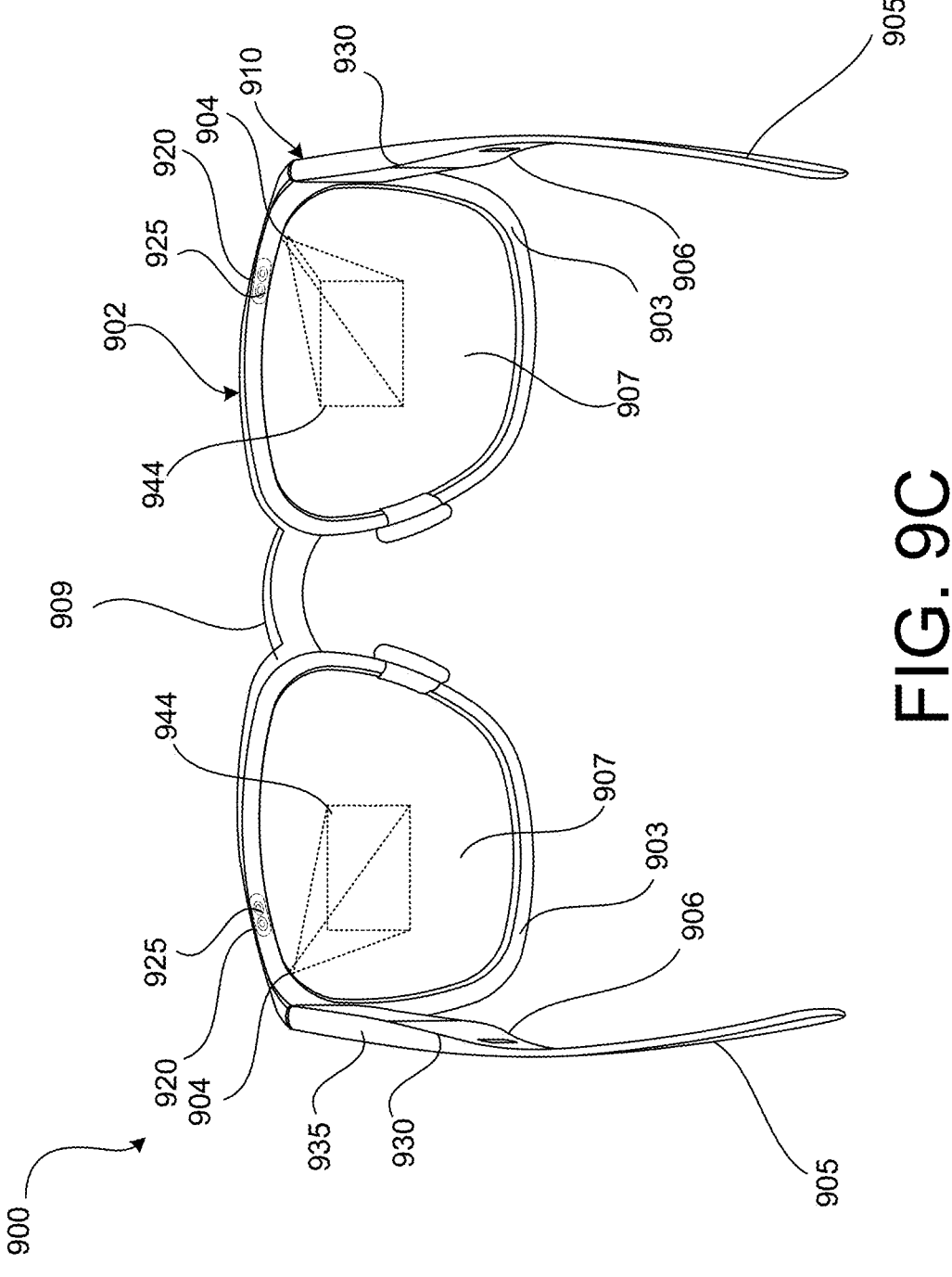
FIG. 9C is a rear view.
Figure 9D:
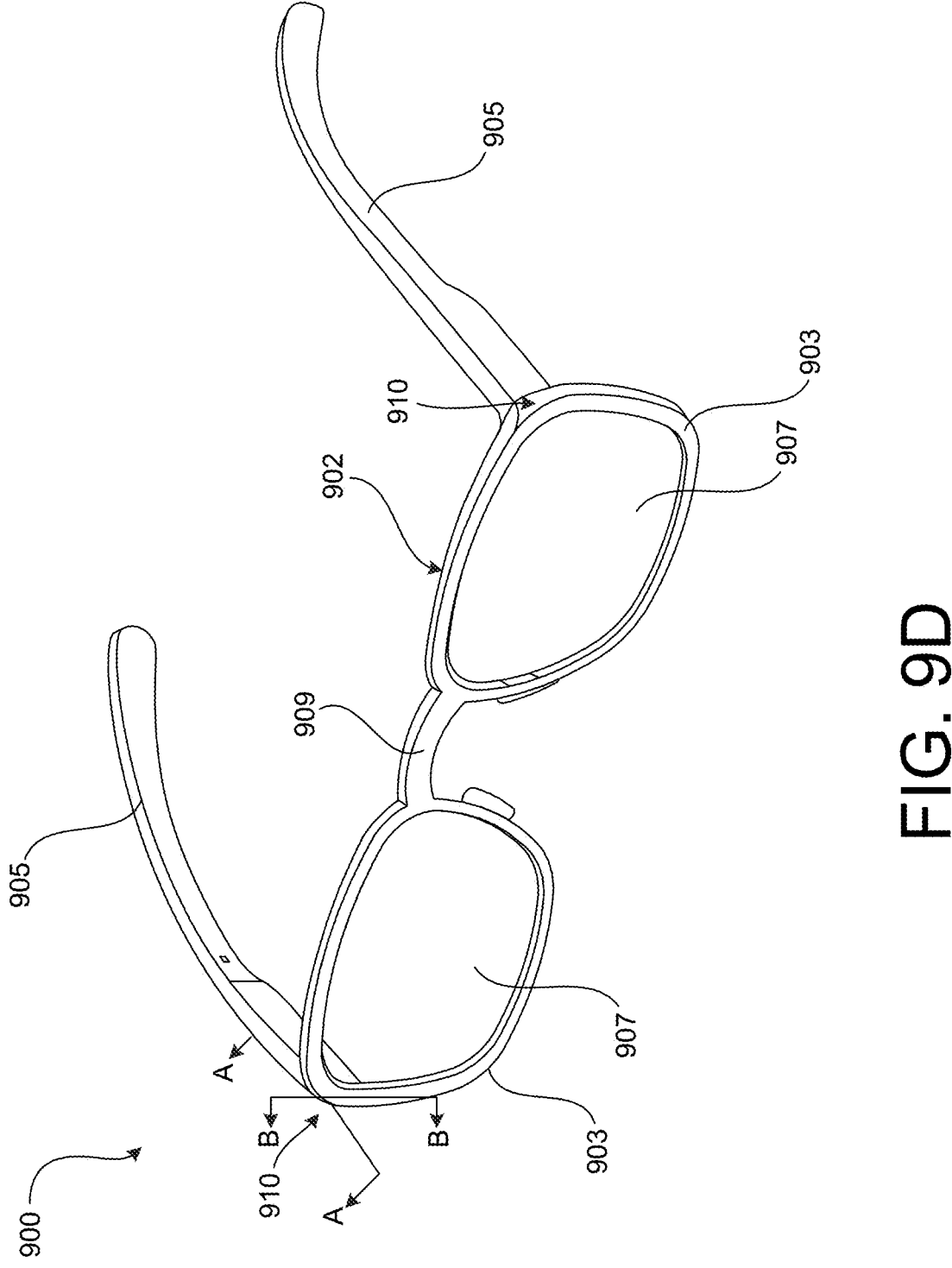
FIG. 9D is a perspective view, of the example head mounted wearable device shown in FIG. 9A, according to various aspects.

FIGS. 9A to 9D illustrate a user wearing an example head mounted wearable device 100. In this example, the example head mounted wearable device 900 is in the form of example smartglasses including display capability and computing/processing capability, for purposes of discussion and illustration. The principles to be described herein may be applied to other types of eyewear, both with and without display capability and/or computing/processing capability. FIG. 9B is a front view, FIG. 9C is a rear view, and FIG. 9D is a perspective view, of the example head mounted wearable device 900 shown in FIG. 1A. As noted above, in some examples, the example head mounted wearable device 900 may take the form of a pair of smartglasses, or augmented reality glasses. The head mounted wearable device 900 shown in FIGS. 9A through 9D includes a bridge portion 909, rim portions 903, and respective arm portions 905. The junctions between the rim portions 903 and arm portions 905 form shoulders.

As shown in FIGS. 9B-9D, the example head mounted wearable device 900 includes a frame 902 worn by a user. The frame 902 includes a front frame portion defined by rim portions 903 surrounding respective optical portions in the form of lenses 907, with a bridge portion 909 connecting the rim portions 903. Arm portions 905 are coupled, for example, pivotably or rotatably coupled, to the front frame by hinge portions 910 at the respective rim portion 903. In some examples, the lenses 907 may be corrective/prescription lenses. In some examples, the lenses 907 may be an optical material including glass and/or plastic portions that do not necessarily incorporate corrective/prescription parameters. A display device 904 may be coupled in a portion of the frame 902. In the example shown in FIGS. 9B and 9C, the display device 904 is coupled in the arm portion 905 of the frame 902. With the display device 904 coupled in the arm portion 905, an eye box extends toward the lens(es) 907, for output of content at an output coupler 944 at which content output by the display device 904 may be visible to the user. In some examples, the output coupler 944 may be substantially coincident with the lens(es) 907. In some examples, the head mounted wearable device 900 can also include an audio output device 906 (such as, for example, one or more speakers), an illumination device 908, a sensing system 911, a control system 912, at least one processor 914, and an outward facing image sensor 916 (e.g., a world-facing camera).

In some examples, the display device 904 may include a see-through near-eye display. For example, the display device 904 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 907 (e.g., real images), next to content (for example, digital images, user interface elements, virtual images, and the like) generated by the display device 904.

In some examples, the head mounted wearable device 900 may include a gaze tracking device 920 including, for example, one or more sensors 925, to detect and track eye gaze direction and movement. Data captured by the sensor(s) 925 may be processed to detect and track gaze direction and movement as a user input. In some examples, the sensing system 911 may include various sensing devices and the control system 912 may include various control system devices including, for example, one or more processors 914 operably coupled to the components of the control system 912. In some examples, the control system 912 may include a communication module providing for communication and exchange of information between the head mounted wearable device 900 and other external devices.

In addition, the head mounted wearable device 900 may include a set of microphones 930. As shown in FIG. 9C, the set of microphones are embedded in an arm portion 905, but in some implementations the set of microphones may be placed in the rim portion 903. The set of microphones 930 is configured to detect audio signals and convert those audio signals into electronic signals for processing by the one or more processors 914.

Moreover, the head mounted wearable device 900 may include an IMU 935 as part of its sensing capability. The IMU 935 is configured to detect motion on the head mounted wearable device 900. The IMU 935 includes an accelerometer for three-dimensional linear motion and a gyroscope for three-dimensional rotating motion. In some implementations, the accelerometer outputs an electronic signal for each of the three dimensions of motion in response to detecting a linear movement corresponding to the head mounted wearable device 900. The electronic signals are then sent to the one or more processors 914 for processing. The one or more processors 914 include processing circuitry that operates on the electronic signals from the set of microphones 930 and the IMU 935 to detect and identify gestures.

Figure 10:
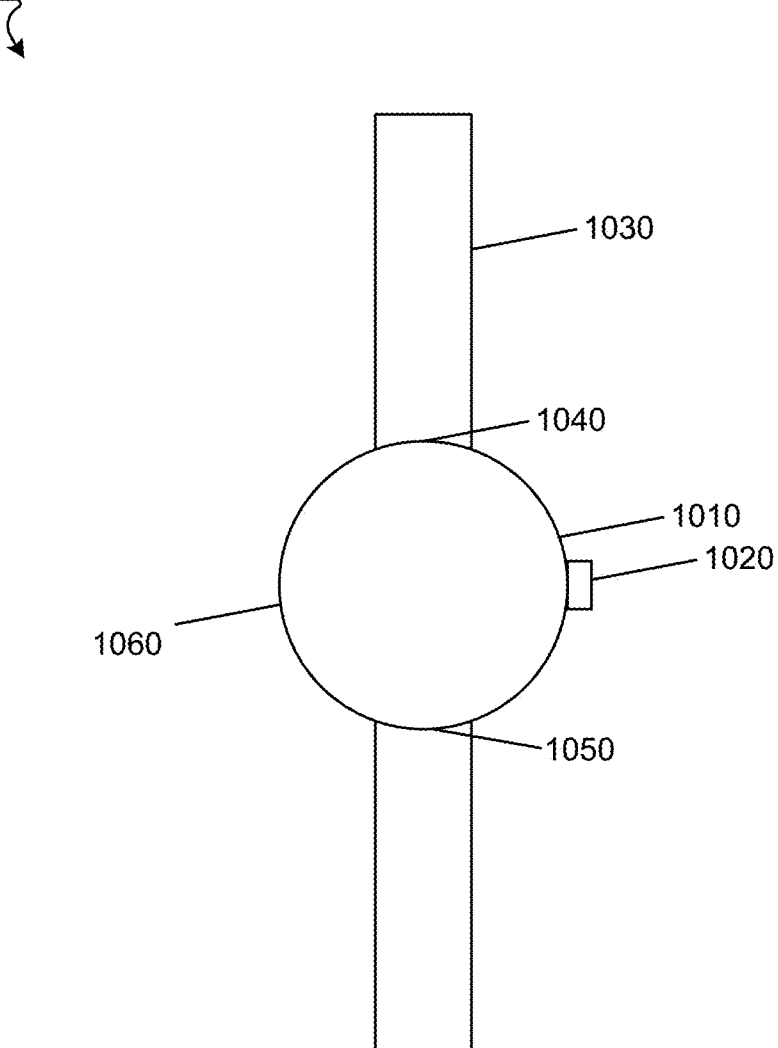
FIG. 10 is a diagram that illustrates a wrist-worn wearable device.

FIG. 10 is a diagram that illustrates a wrist-worn wearable device 1000. The wrist-worn wearable device as shown in FIG. 10 is a smartwatch with a face 1010 that contains various electronic components including processing circuitry 820 of FIG. 8. The wrist-worn wearable device 1000 also includes a dial 1020 and a wristband 1030.

The components included in the face 1010 may include various sensors including a top microphone 1040, a bottom microphone 1050, and an IMU 1060. The top microphone 1040 and the bottom microphone 1050 are configured to convert audio signals to electronic signals to be processed by the processing circuitry 820 of FIG. 8.

The processing circuitry 820 of FIG. 8 is configured to take electronic signals from the top microphone 1040, the bottom microphone 1050, and the IMU 1060 and determine whether a gesture has been made and if so, identify the gesture and perform an operation corresponding to the gesture.

For example, a directional swipe on the face 1010 may be configured to cause the processing circuitry 820 of FIG. 8 to change menus displayed on the face 1010. The electronic signals corresponding to audio generated by the directional swipe may be combined into a first audio signal, while the three components of the electronic signal generated by the IMU 1060 may be combined into a second electronic signal. In some implementations, the combining of the signals may take the form of concatenation. In some implementations, the second electronic signal is generated from the magnitude of the three components produced by the IMU 1060. The combined signals are then processed by the processing circuitry 820 of FIG. 8 to determine whether a gesture has been made and if so, that the gesture was a directional swipe in a certain direction (e.g., forward, backward, left, or right). The processing circuitry then operates on the wrist-worn wearable device 1000, e.g., by changing the menu in response to the directional swipe.

FIG. 11 is a flowchart 1100 that illustrates an example method of performing gesture detection. The flowchart 1100 may depict operations of a computer-implemented method. Although the flowchart 1100 is explained with respect to the wearable device 100 of FIGS. 1A to 1D, the operations may be executed by any of the examples discussed herein. Although the flowchart 1100 of FIG. 11 illustrates the operations in sequential order, it will be appreciated that this is merely an example, and that additional or alternative operations may be included. Further, operations of FIG. 11 and related operations may be executed in a different order than that shown, or in a parallel or overlapping fashion.

Operation 1102 includes receiving a first electronic signal with audio data, ultrasound data, or radio frequency data from a sensor of a wearable device. Operation 1104 includes receiving a second electronic signal including inertial measurement unit (IMU) data from an IMU of the wearable device. Operation 1106 includes generating an indicator of a predefined gesture using the first electronic signal and the second electronic signal, the indicator including information that indicates whether a user has made the predefined gesture. Operation 1108, includes, in response to the indicator indicating that the user has made the predefined gesture, executing an operation on the wearable device corresponding to the predefined gesture.

Clause 1. A method comprising: receiving a first electronic signal with audio data, ultrasound data, or radio frequency data from a sensor of a wearable device; receiving a second electronic signal including inertial measurement unit (IMU) data from an IMU of the wearable device; generating an indicator of a predefined gesture using the first electronic signal and the second electronic signal, the indicator including information that indicates whether a user has made the predefined gesture; and in response to the indicator indicating that the user has made the predefined gesture, executing an operation on the wearable device corresponding to the predefined gesture.

Clause 2. The method of clause 1, wherein the first electronic signal includes the audio data from one or more microphones on the wearable device.

Clause 3. The method of clause 2, further comprising: receiving a third electronic signal with the ultrasound data from an ultrasonic frequency sensor on the wearable device; and generating the indicator using the first electronic signal, the second electronic signal, and the third electronic signal.

Clause 4. The method of clause 2, further comprising: receiving a third electronic signal with the radio frequency data from a radio frequency sensor; and generating the indicator using the first electronic signal, the second electronic signal, and the third electronic signal.

Clause 5. The method of clause 1, wherein generating the indicator includes: inputting the first electronic signal and the second electronic signal into a machine-learning (ML) model, wherein the indicator includes an identifier of the predefined gesture.

Clause 6. The method of clause 5, further comprising: synchronizing samples of the first electronic signal and the second electronic signal in time to produce synchronized samples of the first electronic signal and the second electronic signal; combining the synchronized samples of the first electronic signal and the second electronic signal to produce combined samples; and inputting the combined samples into the ML model.

Clause 7. The method of clause 6, wherein combining the synchronized samples of the first electronic signal and the second electronic signal includes: concatenating the synchronized samples of the first electronic signal and the second electronic signal.

Clause 8. The method of clause 6, further comprising: applying a signal filter to the synchronized samples; and converting the synchronized samples to a frequency domain using one or more transforms.

Clause 9. The method of clause 1, wherein the first electronic signal includes samples at a first sampling rate, and the second electronic signal includes samples at a second sampling rate, the second sampling rate being different than the first sampling rate.

Clause 10. The method of clause 1, wherein executing the operation includes initiating an action with respect to a language model.

Clause 11. A wearable device comprising: at least one processor; and a non-transitory computer-readable medium storing executable instructions that cause the at least one processor to execute operations, the operations comprising: receiving a first electronic signal with audio data, ultrasound data, or radio frequency data from a sensor of a wearable device; receiving a second electronic signal with inertial measurement unit (IMU) data from an IMU of the wearable device; generating an indicator of a predefined gesture using the first electronic signal and the second electronic signal, the indicator including information that indicates whether a user has made the predefined gesture; and in response to the indicator indicating that the user has made the predefined gesture, executing an operation on the wearable device corresponding to the predefined gesture.

Clause 12. The wearable device of clause 11, wherein the first electronic signal includes the ultrasound data from an ultrasonic frequency sensor on the wearable device.

Clause 13. The wearable device of clause 12, wherein the operations further comprise: receiving a third electronic signal with the audio data from one or more microphones on the wearable device; and generating the indicator using the first electronic signal, the second electronic signal, and the third electronic signal.

Clause 14. The wearable device of clause 12, wherein the operations further comprise: receiving a third electronic signal with the radio frequency data from a radio frequency sensor; and generating the indicator using the first electronic signal, the second electronic signal, and the third electronic signal.

Clause 15. The wearable device of clause 11, wherein the operations further comprise: generating input feature data based on the first electronic signal and the second electronic signal; and inputting the input feature data into a machine-learning (ML) model, the indicator including an identifier of the predefined gesture.

Clause 16. The wearable device of clause 15, wherein the operations further comprise: applying one or more signal filters to the first electronic signal and the second electronic signal; applying one or more frequency transforms to the first electronic signal and the second electronic signal; and combining the first electronic signal and the second electronic signal to form the input feature data.

Clause 17. A non-transitory computer-readable medium storing executable instructions that when executed by at least one processor cause the at least one processor to execute operations, the operations comprising: receiving a first electronic signal with audio data, ultrasound data, or radio frequency data from a sensor of a wearable device; receiving a second electronic signal with inertial measurement unit (IMU) data from an IMU of the wearable device; generating an indicator of a predefined gesture using the first electronic signal and the second electronic signal, the indicator including information that indicates whether a user has made the predefined gesture; and in response to the indicator indicating that the user has made the predefined gesture, executing an operation on the wearable device corresponding to the predefined gesture.

Clause 18. The non-transitory computer-readable medium of clause 17, wherein the first electronic signal includes the radio frequency data from an ultrasonic frequency sensor on the wearable device.

Clause 19. The non-transitory computer-readable medium of clause 18, wherein the operations further comprise: receiving a third electronic signal with the audio data from one or more microphones on the wearable device; and generating the indicator using the first electronic signal, the second electronic signal, and the third electronic signal.

Clause 20. The non-transitory computer-readable medium of clause 18, wherein the operations further comprise: receiving a third electronic signal with the ultrasound data from an ultrasonic frequency sensor; and generating the indicator using the first electronic signal, the second electronic signal, and the third electronic signal.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A method comprising:
receiving a first electronic signal with audio data, ultrasound data, or radio frequency data from a sensor of a wearable device;
receiving a second electronic signal including motion data from a motion sensor of the wearable device;
generating feature data from the first electronic signal and the second electronic signal, the feature data being configured to include values from the audio data, ultrasound data, radio frequency data, and motion data;
generating an indicator of a gesture that is predefined based on the feature data, the indicator including information that indicates whether a user has made the gesture; and
in response to the indicator indicating that the user has made the gesture, causing an interaction with a model on the wearable device.

2. The method of claim 1, wherein the first electronic signal includes the audio data from one or more microphones on the wearable device.

3. The method of claim 2, further comprising:
receiving a third electronic signal with the ultrasound data from an ultrasonic frequency sensor on the wearable device; and
generating the indicator using the first electronic signal, the second electronic signal, and the third electronic signal.

4. The method of claim 2, further comprising:
receiving a third electronic signal with the radio frequency data from a radio frequency sensor; and
generating the indicator using the first electronic signal, the second electronic signal, and the third electronic signal.

5. The method of claim 1, wherein generating the indicator includes:
inputting the first electronic signal and the second electronic signal into a machine-learning (ML) model, wherein the indicator includes an identifier of the gesture.

6. The method of claim 5, further comprising:
synchronizing samples of the first electronic signal and the second electronic signal in time to produce synchronized samples of the first electronic signal and the second electronic signal;
combining the synchronized samples of the first electronic signal and the second electronic signal to produce the feature data; and
inputting the feature data into the ML model.

7. The method of claim 6, wherein combining the synchronized samples of the first electronic signal and the second electronic signal includes:
concatenating the synchronized samples of the first electronic signal and the second electronic signal.

8. The method of claim 6, further comprising:
applying a signal filter to the synchronized samples; and
converting the synchronized samples to a frequency domain using one or more transforms.

9. The method of claim 1, wherein the first electronic signal includes samples at a first sampling rate, and the second electronic signal includes samples at a second sampling rate, the second sampling rate being different than the first sampling rate.

10. The method of claim 1, wherein the model is a language model and causing the interaction includes initiating an action with respect to the language model.

11. A wearable device comprising:

at least one processor; and a non-transitory computer-readable medium storing executable instructions that cause the at least one processor to execute operations, the operations comprising:

receiving a first electronic signal with audio data, ultrasound data, or radio frequency data from a sensor of the wearable device;

receiving a second electronic signal with motion data from a motion sensor of the wearable device;

generating feature data from the first electronic signal and the second electronic signal, the feature data being configured to include values from the audio data, ultrasound data, radio frequency data, and motion data;

generating an indicator of a predefined gesture based on the feature data, the indicator including information that indicates whether a user has made the predefined gesture; and in response to the indicator indicating that the user has made the predefined gesture, causing an interaction with a model on the wearable device.

12. The wearable device of claim 11, wherein the first electronic signal includes the ultrasound data from an ultrasonic frequency sensor on the wearable device.

13. The wearable device of claim 12, wherein the operations further comprise:

receiving a third electronic signal with the audio data from one or more microphones on the wearable device; and generating the indicator using the first electronic signal, the second electronic signal, and the third electronic signal.

14. The wearable device of claim 12, wherein the operations further comprise:

receiving a third electronic signal with the radio frequency data from a radio frequency sensor; and generating the indicator using the first electronic signal, the second electronic signal, and the third electronic signal.

15. The wearable device of claim 11, wherein the operations further comprise:

inputting the feature data into a machine-learning (ML) model, the indicator including an identifier of the predefined gesture.

16. The wearable device of claim 15, wherein the operations further comprise:

applying one or more signal filters to the first electronic signal and the second electronic signal;

applying one or more frequency transforms to the first electronic signal and the second electronic signal; and combining the first electronic signal and the second electronic signal to form the feature data.

17. A non-transitory computer-readable medium storing executable instructions that when executed by at least one processor cause the at least one processor to execute operations, the operations comprising:

receiving a first electronic signal with audio data, ultrasound data, or radio frequency data from a sensor of a wearable device;

receiving a second electronic signal with motion data from a motion sensor of the wearable device;

generating feature data from the first electronic signal and the second electronic signal, the feature data being configured to include values from the audio data, ultrasound data, radio frequency data, and motion data;

generating an indicator of a predefined gesture based on the feature data, the indicator including information that indicates whether a user has made the predefined gesture; and in response to the indicator indicating that the user has made the predefined gesture, causing an interaction with a model on the wearable device.

18. The non-transitory computer-readable medium of claim 17, wherein the first electronic signal includes the radio frequency data from an ultrasonic frequency sensor on the wearable device.

19. The non-transitory computer-readable medium of claim 18, wherein the operations further comprise:

receiving a third electronic signal with the audio data from one or more microphones on the wearable device; and generating the indicator using the first electronic signal, the second electronic signal, and the third electronic signal.

20. The non-transitory computer-readable medium of claim 18, wherein the operations further comprise:

receiving a third electronic signal with the ultrasound data from the ultrasonic frequency sensor; and generating the indicator using the first electronic signal, the second electronic signal, and the third electronic signal.

21. The method of claim 1, wherein the interaction with the model includes at least one of invoking the model, transmitting a prompt to the model, confirming a response from the model, or rejecting the response from the model.

22. The method of claim 1, wherein the first electronic signal includes radio frequency data and the indicator of the gesture is generated based on a disruption in the radio frequency data.

* * * * *